United States Patent [19]

Yeung et al.

[11] Patent Number: 5,931,926
[45] Date of Patent: Aug. 3, 1999

[54] METHOD AND APPARATUS FOR DYNAMICALLY CALCULATING DEGREES OF FULLNESS OF A SYNCHRONOUS FIFO

[75] Inventors: Louise Y. Yeung, Redwood City, Calif.; Ling Cen, Beaverton, Oreg.

[73] Assignee: Sun Microsystems, Inc., Mountain View, Calif.

[21] Appl. No.: 08/966,548

[22] Filed: Nov. 10, 1997

Related U.S. Application Data

[63] Continuation of application No. 08/498,618, Jul. 7, 1995, abandoned.

[51] Int. Cl.$^6$ ...................................................... G06F 13/00
[52] U.S. Cl. ................................................................ 710/52
[58] Field of Search ................................................ 710/52

[56] References Cited

U.S. PATENT DOCUMENTS

| | | | |
|---|---|---|---|
| 4,751,671 | 6/1988 | Babetski et al. | 395/250 |
| 4,935,894 | 6/1990 | Ternes et al. | 395/309 |
| 5,426,756 | 6/1995 | Shyi et al. | 395/425 |
| 5,473,756 | 12/1995 | Traylor | 395/250 |

OTHER PUBLICATIONS

Wescon Conference Record, vol. 36, Nov. 17–19, 1992, North Hollywood, US, pp. 174–178, Hastings, et al, "Future Trends in FIFO Architectures".
EPO Patent Application 0 390 453 A (SGS Thomson Microelectronics) Oct. 3, 1990.
Electro Conference Record, vol. 16, Apr. 16, 199, New York, U.S., pp. 147–151, Wenniger, "Using the CY7C44X and CY7C45X FIFOS at 70 MHZ".

*Primary Examiner*—David Y. Eng
*Attorney, Agent, or Firm*—Blakely Sokoloff Taylor & Zafman

[57] ABSTRACT

An interface circuit, coupled between a first circuitry that is synchronous to a first clock (sclk) and a second circuitry that is synchronous to a second clock (mclk), for transferring data between the first and second circuitry and achieving a fast turn-around time between a data request from the mclk domain circuitry and a bus request in the sclk domain. A first FIFO buffer for transferring data from the first circuitry to the second circuitry is provided. Logic associated with the first FIFO to synchronize reads and writes to the first FIFO is also provided. A read Bus Request Enable Generator provides a read bus request enable signal to the first circuitry, and an At_least_x_words_filled Flag Generator provides a plurality of flags, which indicate degrees of fullness of the first FIFO buffer to the second circuitry. A second FIFO buffer transfers data from the second circuitry to the first circuitry. Associated logic for synchronizing reads and writes to the second FIFO buffer is provided. A write Bus Request Enable Generator provides a write bus request enable signal to the first circuitry, and an At_least_y_words_empty Flag Generator provides a plurality of flags, which indicate degrees of emptiness of the second buffer to the second circuitry.

31 Claims, 14 Drawing Sheets

METHOD AND APPARATUS FOR DYNAMICALLY CALCULATING DEGREES OF FULLNESS OF A SYNCHRONOUS FIFO

This is a continuation of application Ser. No. 08/498,618 filed Jul. 7, 1995 now abandoned.

BACKGROUND OF THE INVENTION

1. Field of the Invention

The present invention relates to the field of First in First Out (FIFO) buffers, and particularly to a method and apparatus for simultaneously synchronizing information across a boundary between two asynchronous clock domains and for providing an indication of the degree of FIFO fullness to one clock domain in every clock cycle and providing a flag in every clock cycle for the other clock domain indicating the readiness of the FIFO to accept or provide data.

2. Description of the Related Art

FIG. 1 illustrates a prior art approach to transferring data from one clock domain to another clock domain and back. block_A 3 represents circuitry in clock domain A (e.g., signals in block_A 3 are synchronous to clock_A 5 and have reliable data on the rising edge of clock_A 5). Similarly, block_B 7 represents circuitry and signals that are synchronous to clock_B 9. A FIFO 11 is provided between clock domains A and B. In this case, data is being transferred from block_A 3 to block_B 7 through the FIFO 11. Logic 13, associated with the FIFO, indicates to logic block_A 3 that the FIFO 11 is full. This associated FIFO logic 13 also indicates to block_B 7 that the FIFO 11 is empty. If the FIFO 11 is full, circuitry in block_A 3 stops the transfer of data into the FIFO 11 from block_A 3 to prevent overwrite of valid data. Upon a Full indication 15, circuitry in block_7 begins to transfer data into block_B 7 until an Empty signal 17 is asserted and received by block_B 7. Block B 7 stops reading data from the FIFO 11 upon an Empty signal 17 so that it will not read invalid data (e.g., stale data).

It is evident in this prior art system that logic in clock domain A will not begin to write to the FIFO until it receives an Empty signal 17. Similarly, logic in clock domain B will not read from the FIFO 11 until a Full indicator 15 is received. Thus, there is a latency when the logic in clock domain A waits for a completely empty FIFO 11 before writing and another latency when logic in clock domain B waits until the FIFO 11 is completely full before reading the contents of the FIFO 11.

This prior art approach is satisfactory when both clock domains are relatively slow or when both are equally fast. This prior art is satisfactory when it is not important to have simultaneous FIFO read and write. In other words, for low through put systems, this approach is sufficient. However, in a Sbus ATM (Asynchronous Transfer Mode) system where the ATM is clocked at a much faster rate than the Sbus, prior art methods are no longer sufficient. In order to squeeze Sbus performance to satisfy the demands of ATM, every clock cycle needs to be salvaged. Moreover, when logic in clock domain B (the Sbus side) requires a fast turnaround (e.g., a ATM protocol that requires a 155 megabits per second (Mbps) duplex in an average loaded Sbus 32-bit 32-byte system), this prior art approach becomes inadequate. In a high speed network system, it is imperative to maximize throughput and not wait until the FIFO is 100% full or empty to begin transfer of data into or out of the FIFO. Thus, there is a need for provide varying degrees of fullness or emptiness indications, so as to reduce latency inherent in waiting for a full or empty flag, especially if the FIFO is large.

Furthermore, since logic in clock domain A and logic in clock domain B are asynchronous to each other (e.g., reads and writes to the FIFO are asynchronous), there is a need to dynamically determine at any clock cycle the "true" level of content in the FIFO. For example, if four data words are written to a FIFO by block A and four data words are during the same clock read by block B, there is no net change in the degree of emptiness or fullness of the FIFO.

It is evident that to accurately determine the "true" level of content of the FIFO in any clock cycle, FIFO pointer information from domain B must be synchronized to the clock of domain A, and control information from domain B back to domain A. This information is used to determine the present state or degree of fullness of the FIFO. (e.g., synchronize the signals from the slower clock domain to the faster clock domain).

Information such as control signals, address information, and size information of how much is being written or read from the FIFO may be required to calculate the readiness of the FIFO at each clock cycle (e.g., have enough room or data) to receive or supply from or to an IO DMA slave (e.g., host memory) over the I/O bus.

The prior methods for synchronizing signals from one clock domain to another and back are inadequate for the above-described situations which requires immediate readiness to use the FIFO for data transfer over the IO bus and to maximize throughput for support of high speed networks.

One bit synchronization is not feasible for two reasons. First, as described above, multiple bits of information must be synchronized from one clock domain to another in order to correctly calculate the current level and readiness for data transfer of the FIFO. Second, even if only one bit of information is needed to be synchronized from clock domain A to clock domain B and vice versa, prior art one-bit synchronization schemes have an unacceptable transit time or latency. For example, prior art one-bit synchronization schemes operate on a master and slave principle, and full handshake is required (e.g., a bit of information being synchronized from clock domain A to clock domain B and back from B to A is dependent on information in clock domain B and vice versa.) Thus, a state in clock domain A must not change while the synchronization is taking place (e.g., hold the state of clock domain A while synchronizing a signal from clock domain A to clock domain B).

Furthermore, the now synchronized signal in clock domain B is used for calculations in clock domain B. However, after the calculations and updates have made to the signal, it must now be synchronized back to clock domain A for calculations in clock domain A (e.g., the transit time from one clock domain to another and back exceeds the time constraints of the current application).

Multiple bit synchronization across clock domains introduces unique metastability issues. When data is invalid or uncertain at a particular clock edge (e.g. metastability) in a one-bit synchronization scheme, the true data will eventually reach the correct value (0 or 1) (e.g., a delay is inserted and the correct value is presented at the next clock cycle). Since clock A and clock B are completely asynchronous to each other (e.g., the clocks may be different in phase and frequency), data at a particular clock edge of the synchronizing clock may be unpredictable and unreliable in some instances.

However, when multiple bits are simultaneously being synchronized across clock domains (e.g., a plurality of bits in an address or size information), this metastability problem is exacerbated since two or more bits having unreliable data results in a completely wrong address or size and not simply a delay. In other words, the multi-bit value cannot be trusted at the rising clock edge (i.e., metastability). Thus, prior art methods that require multiple bit synchronization across clock domains typically use techniques (e.g., Grey Code or Johnson Counter) to ensure that a multiple-bit value can only change one bit per clock cycle. These schemes are expensive to implement (e.g., it wastes bits to implement the Grey Code especially if the multiple-bit value is greater than four bits), and the resulting hardware, especially if there are many signals being synchronized across the clock boundaries, is difficult to test and debug.

Thus, there is also a need for a method and apparatus to provide synchronization logic that minimizes the number of bits being synchronized between clock domains and yet provides a true indicator of readiness for data transfer of the FIFO at each clock cycle.

SUMMARY OF THE INVENTION

An interface circuit that is coupled between a first circuitry that is synchronous to a first clock (e.g., sclk) and a second circuitry that is synchronous to a second clock (e.g., mclk) for transferring data between the first circuitry and the second circuitry with minimal latency and minimal circuit complexity.

The present invention includes a FIFO buffer (i.e., a Read FIFO) for transferring data, which is written into the FIFO by the first circuitry and read from the FIFO by the second circuitry. The Read FIFO has a plurality of storage locations. This Read FIFO has an associated read pointer that points to the next read location in the FIFO, and an associated write pointer that points to the next write location in the FIFO. The first circuitry writes to a location pointed to by the write pointer, and the second circuitry reads a location pointed to be the read pointer.

The present invention provides logic to synchronize the asynchronous reads and writes to the Read FIFO and to manage the read and write pointers of the Read FIFO. The present invention also provides a Read Bus Request Enable Generator that provides a bus request enable, which is an indication of the readiness of the FIFO to transfer data onto the I/O bus to the first circuitry based on the read pointer, the write pointer, size and address information from the second circuitry, bus cycle information from the first circuitry, mclk and sclk. The Read Bus Request Enable Generator maximizes the utilization of bandwidth of the bus in the sclk domain to support a 155/622 Mbps ATM SAR protocol by providing a quick turn-around time from data requests from the second circuitry to first circuitry bus requests.

Moreover, the Read Bus Request Enable Generator enables circuitry in the sclk domain to assert a bus request while a previous DMA cycle is still in progress (e.g., the case of back-to-back DMA reads). The Read Bus Request Enable Generator includes circuitry to calculate how many free storage locations are in the FIFO and also to calculate the amount of data yet to be written into the FIFO. These calculations are made in the mclk domain in every clock cycle, and a one bit signal, rd_BR_en, is synchronized to the sclk domain.

The present invention also includes an At_least_x_ words_filled Flag Generator that provides a plurality of flags, which indicate degrees of fullness of the Read FIFO to the second circuitry. The At_least_x_words_filled Flag Generator provides indicators of varying degrees of fullness of the Read FIFO rather than just a FIFO full indicator. The present invention allows an ATM core (e.g., interface logic) to do partial reads ahead of time rather than wait for all the data to be in the FIFO. The time to fill a FIFO is dependent on I/O bus slave latency. The present invention provides in every clock cycle to the SBus side a flag indicating the readiness of the FIFO to accept all data from a handshake oriented variable slave latency bus DMA read or to provide all data to a handshake oriented variable slave latency bus DMA write (e.g., a slave device has a variable latency in responding to bus requests, to anticipate worst case scenario).

The present invention provides this Flag Generator to ensure swift data movement in finer granularity and to reduce the latency discussed in the background of the invention. Specifically, these indicators of varying degrees of fullness obviate the need for mclk domain circuitry to wait until the Read FIFO is completely full before reading data from the buffer. The present invention enables mclk domain circuitry to read data from the Read FIFO as soon as the Read FIFO has the requisite number of filled storage locations.

The present invention also includes a FIFO buffer for transferring data from the second circuitry to the first circuitry (i.e., a Write FIFO). The Write FIFO has a plurality of storage locations. The Write FIFO also has a read pointer that points to the next read location and a write pointer that points to the next write location. The first circuitry reads to a storage location in the Write FIFO pointed to by the read pointer, and the second circuitry writes to a location in the Write FIFO pointed to by the write pointer.

The present invention includes logic to synchronize the reads and writes to the Write FIFO and to manage the read and write pointers. The present invention also includes a Write Bus Request Enable Generator that generates a bus request enable signal to the first circuitry based upon the read pointer, the write pointer, size and address information from the second circuitry, bus cycle information from the first circuitry, mclk and sclk.

In the event of back-to-back DMA writes, this Enable Generator enables circuitry in the sclk domain to assert a bus request while a previous DMA write cycle is still in progress. The Enable Generator dynamically determines in the mclk domain when a bus request enable may be generated, and one bit of information is then synchronized to the sclk domain in the form of a wr_BR_en signal.

The present invention also includes an At_least_y_ words_empty Flag Generator for providing a plurality of flags to the second circuitry based upon the read pointer, the write pointer, and mclk. These empty flags indicate to the second circuitry at every mclk cycle the number of empty storage locations in the Write FIFO.

Since the bus protocol in the sclk domain is asynchronous (e.g., data does not always come on every sclk cycle), the present invention provides flags that indicate varying degrees of emptiness of the Write FIFO, so that as soon as there is sufficient room in the Write FIFO, circuitry in the mclk domain may begin writing some data to the Write FIFO.

Thus, the present invention provides a Read FIFO, associated synchronization logic, a Read Bus Request Enable Generator, an At_least_x_words_filled Flag Generator, a Write FIFO, associated synchronization logic, a Write Bus Request Enable Generator and At_least_y_words_empty Flag Generator for achieving fast turn-around between mclk domain circuitry requests and sclk domain bus requests by minimizing the latency inherent in waiting for only a completely full or completely empty flag. Furthermore, the present invention provides to the second circuitry an accurate indication on every mclk cycle of the state of the FIFOs (e.g., number of storage location filled or available in the Read and Write FIFOs).

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

Figure 1:
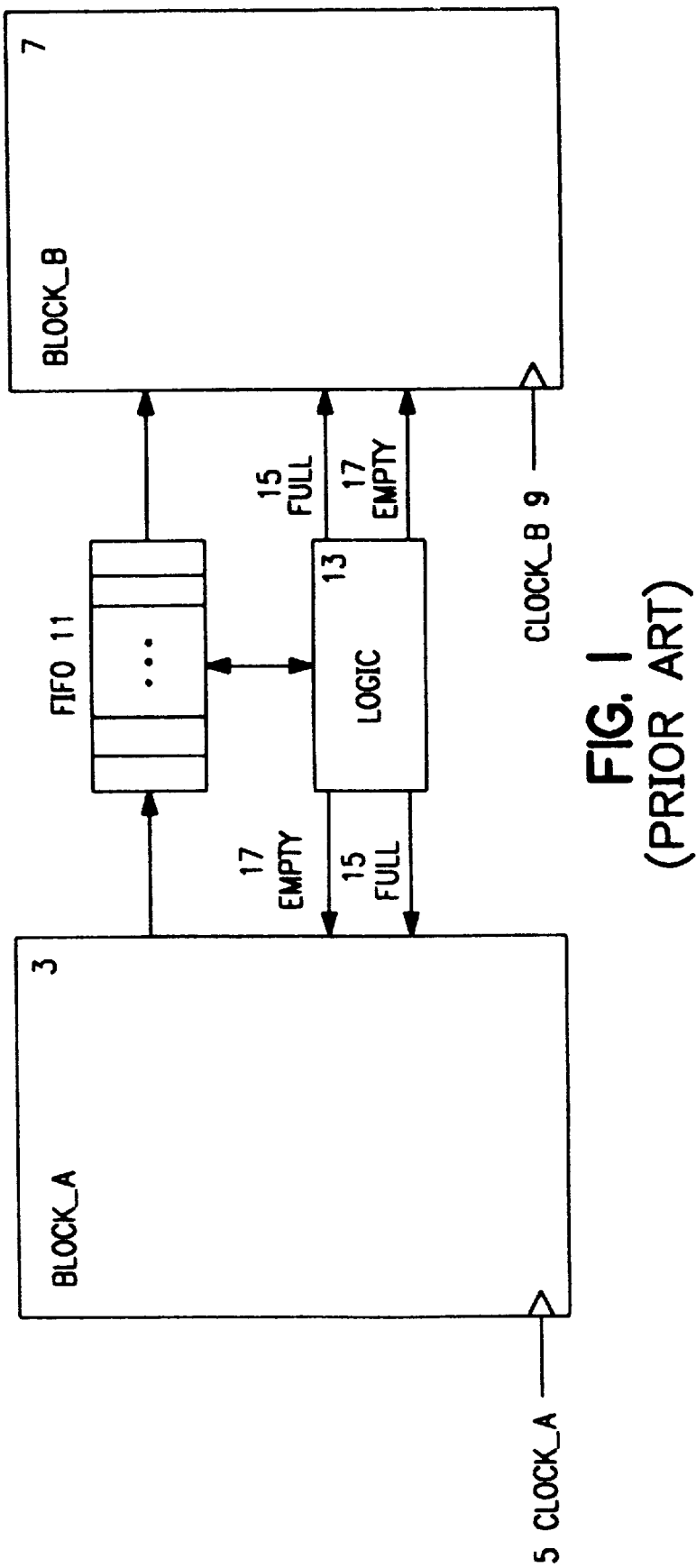
FIG. 1 illustrates a prior art interface circuit.
Figure 2:
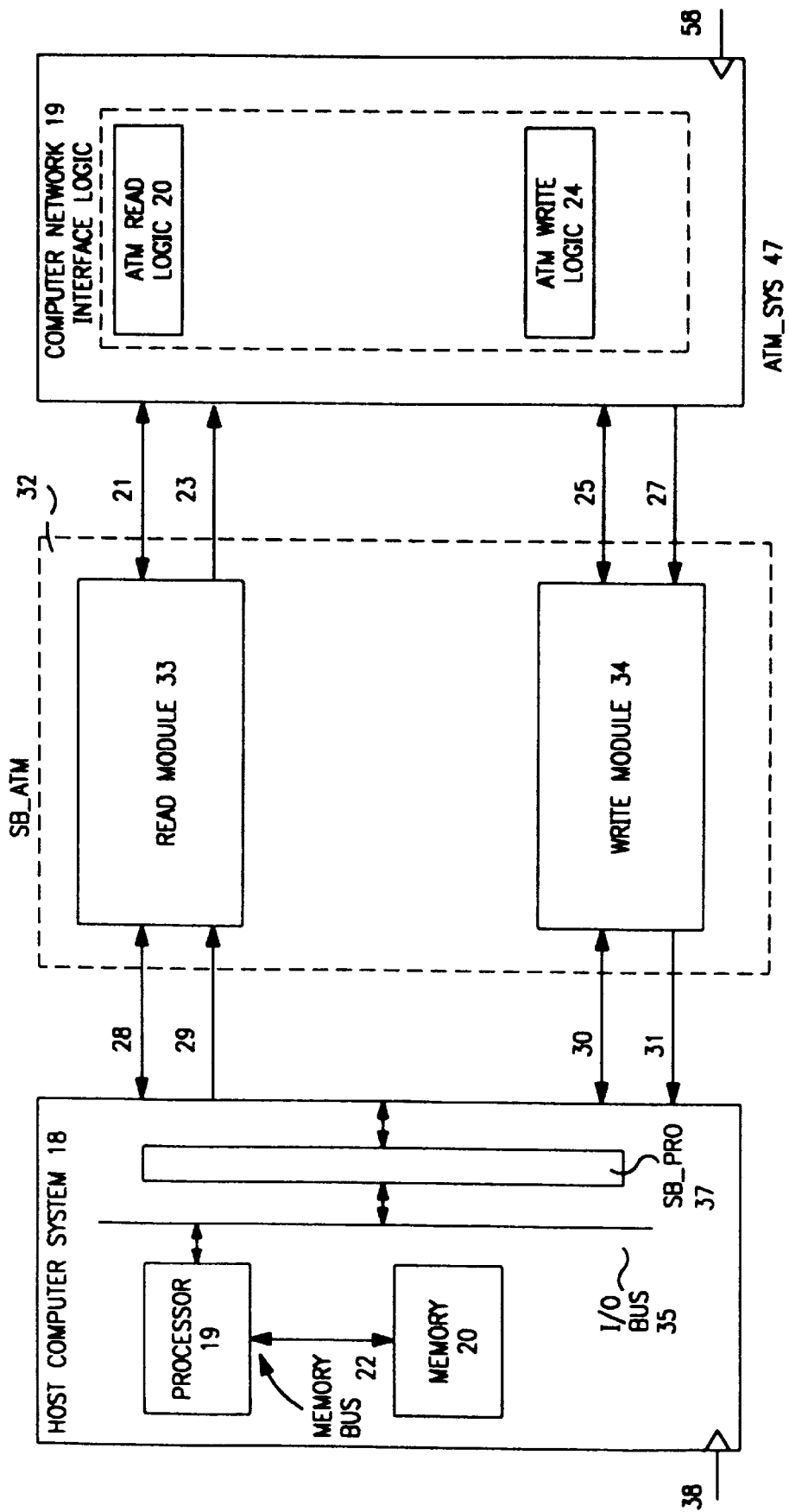
FIG. 2 illustrates a system level block diagram of the present invention.

FIG. 2 illustrates a computer system incorporating the present invention 32. The present invention 32 is an interface circuit (i.e., SB_ATM) for transferring data between a host computer system 18 and a computer network interface 19. The interface circuit, SB_ATM, 32 includes a Read Module 33 for transferring data from the host computer system 18 to the computer network interface logic 19, and a Write Module 34 for transferring from the computer network interface logic 19 to the host computer system 18.

Host computer system 18 includes a processor 19, a host memory 20, an input/output (I/O) bus 35 that connects I/O devices to the host processor 19, and an I/O device circuitry 37 (e.g., Sbus protocol engine) for implementing protocol interface to the I/O bus 35. The processor 19 is coupled to the host memory 20 via a memory bus 22. The elements in the host computer system 18 are synchronous with respect to a first clock (e.g., sclk 38).

The computer network interface logic 19 includes an ATM_SYS 47 for translating data having a first format as specified by the host computer system 18 to a second format as specified by the computer network 19. The ATM_SYS 47 includes ATM Read Logic 20 that manages the transfer of data from the Read Module 33 through data path 23 into ATM_SYS 47. The ATM Read Logic 20 provides a plurality of control and address information to the Read Module 33 and is provided a plurality of flags from the Read Module 33 through data path 21.

The protocol engine 37 provides data (e.g., from a memory 20) to the Read Module 33 through data path 29. Protocol engine 37 provides the Read Module 33 with bus cycle information, sclk 38 and a plurality of control signals through data path 28, and is provided a bus request enable signal also through data path 28.

Computer network interface logic 19 also includes ATM Write Logic 24 for managing the transfer of data from the computer network media into the Write Module 34 through data path 27. The ATM Write Logic 24 provides size information, address information, and an enable signal to the Write Module 34 through data path 25 and is provided a plurality of flags indicating a number of empty storage locations in the Write Module 34 by the Write Module 34. The circuit components in ATM_SYS 47 are synchronous to a second clock (e.g., mclk 58).

The Write Module 34 transfers data to the host computer system 18 (e.g., into memory 20) through data path 31. The protocol engine 37 provides the Write Module 34 with bus cycle information, the sclk 38 and a plurality of control signals through data path 30, and Write Module 34 provides a bus request enable signal to SB_PRO 37.

Figure 3:
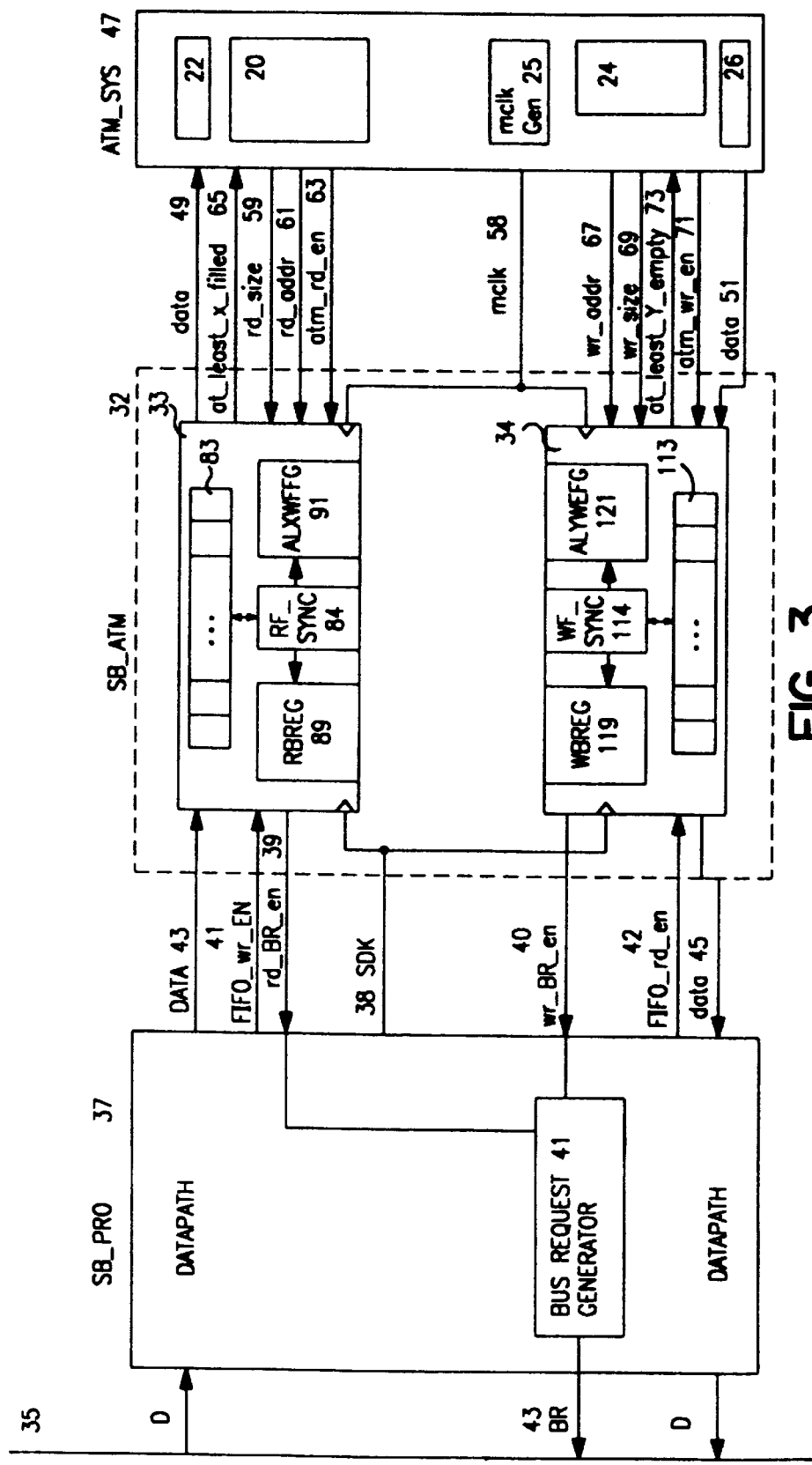
FIG. 3 illustrates a more detailed system level block diagram of the present invention.

FIG. 3 illustrates in greater detail the present invention in block diagram fashion. The Read Module 33 further includes a Read FIFO 83 coupled to synchronization logic 84 for the Read FIFO 83. The Rf_Sync 84 is further coupled to a Read Bus Request Enable Generator (RBREG) 89 and an At_least_x_words_filled Flag Generator (ALXWFFG) 91.

The Read FIFO buffer (Read FIFO) 83 has a plurality of storage locations. The Read FIFO buffer 83 is written to by the SB_PRO 37 at a location pointed to by a write pointer (wptr) which is managed by a RF_SYNC unit 84. The Read FIFO 83 is read by the ATM_SYS 47 from a location pointed to by a read pointer (rptr) which is also managed by the RF_SYNC unit 84. The Read FIFO buffer 83 may be implemented with a dual port RAM (DPRAM) with a Read port and a Write port. The rptr and wptr pointers serve as addressees into this dual port RAM.

ATM_SYS 47 provides a second clock to SB_ATM 31 (i.e., mclk 58) that has a higher frequency than the sclk 38. The sclk 38 and mclk 58 are asynchronous to each other in that there is no required relationship between the frequency or phase of these two clocks.

Read FIFO 83 buffers data that is being transferred from SB_PRO 33 to ATM_SYS 47. Data is written to the Read FIFO 83 by SB_PRO 33 via a FIFO_wr_en 41 that is synchronous to sclk. Data may or may not be written to the Read FIFO 83 at every sclk 38 cycle. If FIFO_wr_enable 41 is asserted at the rising edge of sclk, data is written into the Read FIFO 83. FIFO_wr_en 41 is sclk-based, and it goes into Read Module 33 to indicate that there is data written into the Read FIFO 83. Similarly, data may be read from the Read FIFO 83 by ATM_SYS 47 at every mclk 58 cycle. If a ATM_rd_en signal 63 is asserted for one mclk, then one word of data is read from the Read FIFO 83 at the rising edge of mclk 58 into ATM_SYS 47. The number of mclk cycles that ATM_rd_en 63 is asserted is equal to the number of words read out.

The designations, "read" and "write", when used in conjunction with "FIFO" indicate accesses to data in a host computer system (e.g., memory 20). For example, a "Read" indicates that data is being read from the memory 20 in the host computer system. Likewise, a "Write" indicates a transfer of data to the memory 20 in the host computer system.

Since sclk 38 is asynchronous to mclk 58, the Read FIFO 83, standing alone, will be written to and read from in an asynchronous manner. The present invention provides RF_SYNC 84 to synchronize the asynchronous Reads and Writes to it. Thus, the present invention provides synchronization logic, which will be described in greater detail hereinafter, to synchronize the Read FIFO.

The Write Module 34 also includes a Write FIFO 113 coupled to a WR_SYNC logic 114. The Write Module 34 also includes a Write Bus Request Enable Generator (WBREG) 119 and an At_least_y_words_empty Flag Generator (ALYWEFG) 121 both of which are coupled to the WF_SYNC 114. The Write FIFO 113 is written to by ATM_SYS 47 through the combination of mclk 58 and ATM_wr_en 71. The Write FIFO 113 may be written to at every mclk cycle 58. If the ATM_wr_en signal is asserted 71, then data is written to the Write FIFO 113 at the rising edge of mclk 58 from ATM_SYS 47. The Write FIFO 113 is read by SB_PRO 33 through a combination of the sclk 38 and the FIFO_rd_en 42 signal. If the FIFO_rd_en 42 is asserted at the rising edge of the sclk 38, data is read by SB_PRO 33 from the Write FIFO 113.

The WF_SYNC logic 114 synchronizes the reads and writes to the Write FIFO 113.

The present invention, SB_ATM 31, is coupled to SB_PRO 33, which provides an interface between the SB_ATM 31 and the I/O bus 35. As discussed previously, SB_PRO 33 is the protocol engine that implements the I/O bus 35 protocol. In this embodiment SB_PRO 33 is a state machine that implements the IEEE Institute of Electronics Electrical Engineers SBus 1496 protocol. For example, SB_PRO 33 generates the timing and handshake signals for transferring addresses and data across the bus. SB_PRO 33 includes a data path (not shown) to transfer data from the SB_ATM 31 to memory 20 and vice versa through the I/O bus 35. In addition to providing data paths for transferring data to and from memory 37, SB_PRO 33 also provides several signals relevant to the present invention.

First, SB_PRO 33 provides the system clock 38 (e.g., salk for the Sbus) that is generated by the computer system (e.g., host processor 19). As discussed previously, the system components, such as memory 20 and the I/O bus 35 are synchronous with respect to sclk 38. Second, SB_PRO 33 provides a FIFO Write enable signal (FIFO_wr_en) 41 that enables data to be written to the Read FIFO 83 and a FIFO read enable signal (FIFO_rd_en) 42 that enables data to be a read from the Write FIFO 113.

The present invention is also coupled to ATM_SYS 47. ATM_SYS 47 includes a Transmit FIFO 22 for receiving ATM_data_out from the Read FIFO 83 49 and a Receive FIFO 26 for providing ATM_data_in 51 to the present invention. ATM_SYS 47 also includes an mclk clock generator 28 for producing mclk 58. ATM_SYS 47 also includes ATM Read Logic 20 for providing a read enable signal (e.g., ATM_rd_en) 63 to the present invention, as well as, size and address information (e.g., the size of the read and the address of the memory location to be read) in the form of rd_size 57 and rd_addr 61. ATM Read Logic 20 also receives a plurality of At_least_x_words_filled flags from the ALXWFFG 91.

ATM_SYS 47 also includes ATM Write Logic 24 for providing size and address information concerning a write in the form of an initial write address (e.g., wr_addr 67) and the amount of data to be written (e.g., wr_size 67). ATM_Write_Logic 24 also provides a write enable signal (e.g., ATM_wr_en 71) to the present invention and receives a plurality of At_least_y_words_empty flags from the AlYWEFG 121.

The ATM Read and Write logic (20, 24) may enable reads and writes to the Read FIFO 83 and Write FIFO 113 of the present invention at every mclk cycle 58. The ALXWFFG logic 91 and the ALYWEFG logic 121 of the present invention provide a plurality of flags to indicate to the ATM Read and Write Logic, respectively, the number of locations filled in the Read FIFO 83 and the number of locations that are empty in the Write FIFO 113. Logic blocks 91 and 121 dynamically determine and provide the state (e.g., number of locations filled or empty) of the respective FIFO at every mclk 58 cycle so that ATM_SYS 47 can immediately read from the Read FIFO 83 or write to the Write FIFO 113 once a predetermined number of locations are filled or emptied. The present invention provides the state of the Read or Write FIFOs at every mclk cycle since the state of the Read and Write FIFO may change at every mclk cycle.

SB_PRO 33 also includes a bus request generator 41 that asserts a bus request signal 43 onto an I/O bus 35 to a bus arbiter (not shown) that will grant control of the bus 35 to SB_PRO 33.

The present invention 31 provides a read bus request enable signal 39 (i.e., rd_BR_en) and a write bus request enable signal 40 (i.e., wr_BR_en) to the bus request generator 41. In response to either signals, bus request generator 41 is enabled to generate a bus request 43 to the I/O bus 35.

For example, upon receiving a rd_BR_en signal 39, bus request generator 41 is enabled to assert a bus request 43 onto I/O bus 35. Once SB_PRO 33 has been granted control of the bus 35, data is transferred via a Direct Memory Access (DMA) burst cycle from memory 37 through SB_PRO 33 into the Read FIFO 83 of the present invention 31.

Figure 4:
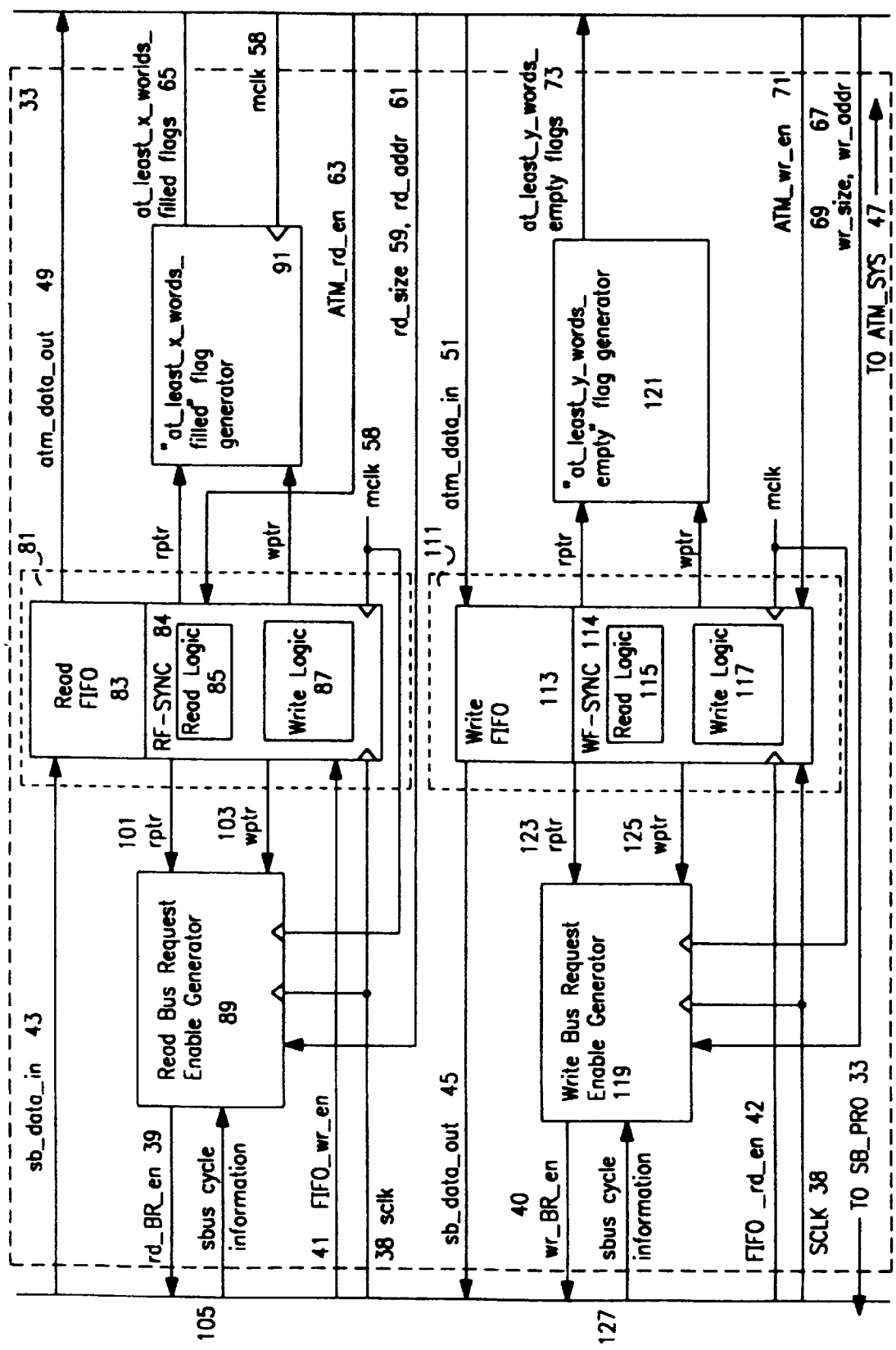
FIG. 4 illustrates a detailed block diagram of the present invention.

FIG. 4 illustrates in greater detail the specific components of SB_ATM 31. The present invention includes a synchronous Read FIFO 81 that further includes the Read FIFO (e.g., dual port RAM) 83 and Rf_Sync 84. Rf_Sync 84 further includes Read Logic 85 that manages the read pointer (rptr) 101 which points to the next location to be read in the Read FIFO 83, and Write Logic 87 that manages the write pointer (wptr) 103, which points to the location for the next write into Read FIFO 83.

A synchronous Read FIFO 81 is provided the sclk 38, the FIFO_wr_en 41 from SB_PRO 33 and mclk 58 and ATM_rd_en 63 from ATM_SYS 47. The synchronous Read FIFO 81 provides the rptr 101 (e.g., FIFO address information) and the wptr 103 (e.g., FIFO address information) to a Read Bus Request Enable Generator 89 and also to an "At_least_x_words_filled" Flag Generator 91.

The Read Bus Request Enable generator 89 receives additional bus cycle information 105 from SB_PRO 33, as well as, DMA read request size and address information from ATM_SYS 47 and provides the rd_BR_en 39 to the SB_PRO 33. The Read Bus Request Enable Generator 89 will be described further hereinafter. The "At_least_x_words_filled" Flag Generator 91 provides the At_least_x_words_filled flags 65 to the ATM_SYS 47, where x is an integer number.

The present invention also includes a synchronous Write FIFO 111 that further includes a second dual port RAM 113 and Wf_Sync 114. Wf_Sync 114 further includes Read Logic 115 for managing the read pointer (rptr) 123 of the Write FIFO and Write Logic 117 for managing the write pointer (wptr) 125 of the Write FIFO 111.

As with the synchronous Read FIFO 81, the synchronous Write FIFO 111 provides the rptr 123 and the wptr 125 to both a Write Bus Request Enable Generator 119 and a "At_least_y_words_empty" Flag Generator 121. ATM_data_in is written to DPRAM 113 and SB_data_out is read from the Write FIFO 111. The Write Bus Request Enable Generator 119 is provided the mclk 58, the sclk 38, size information in wr_size and memory address information in wr_addr from the ATM_SYS 47 and provides a wr_BR_en 40 to the SB_PRO 33. Write enable generator 119 also receive Sbus cycle information 27 from the SB_PRO 33.

The "At_least y_words_empty" Flag Generator 121 is provided the rptr 123 and the wptr 125 and generates an appropriate set of At_least_y_words_empty flag to the ATM_SYS 47. These flags indicate to ATM_SYS 47 the number (e.g., "y", where y is 2 words, 4 words etc.) of empty storage locations in the Write FIFO 113 at every mclk 58 cycle. Similarly, the At_least_x_filled flags 65 indicate at every mclk cycle the number of storage locations in the Read FIFO 81 that are filled with valid data.

Figure 5:
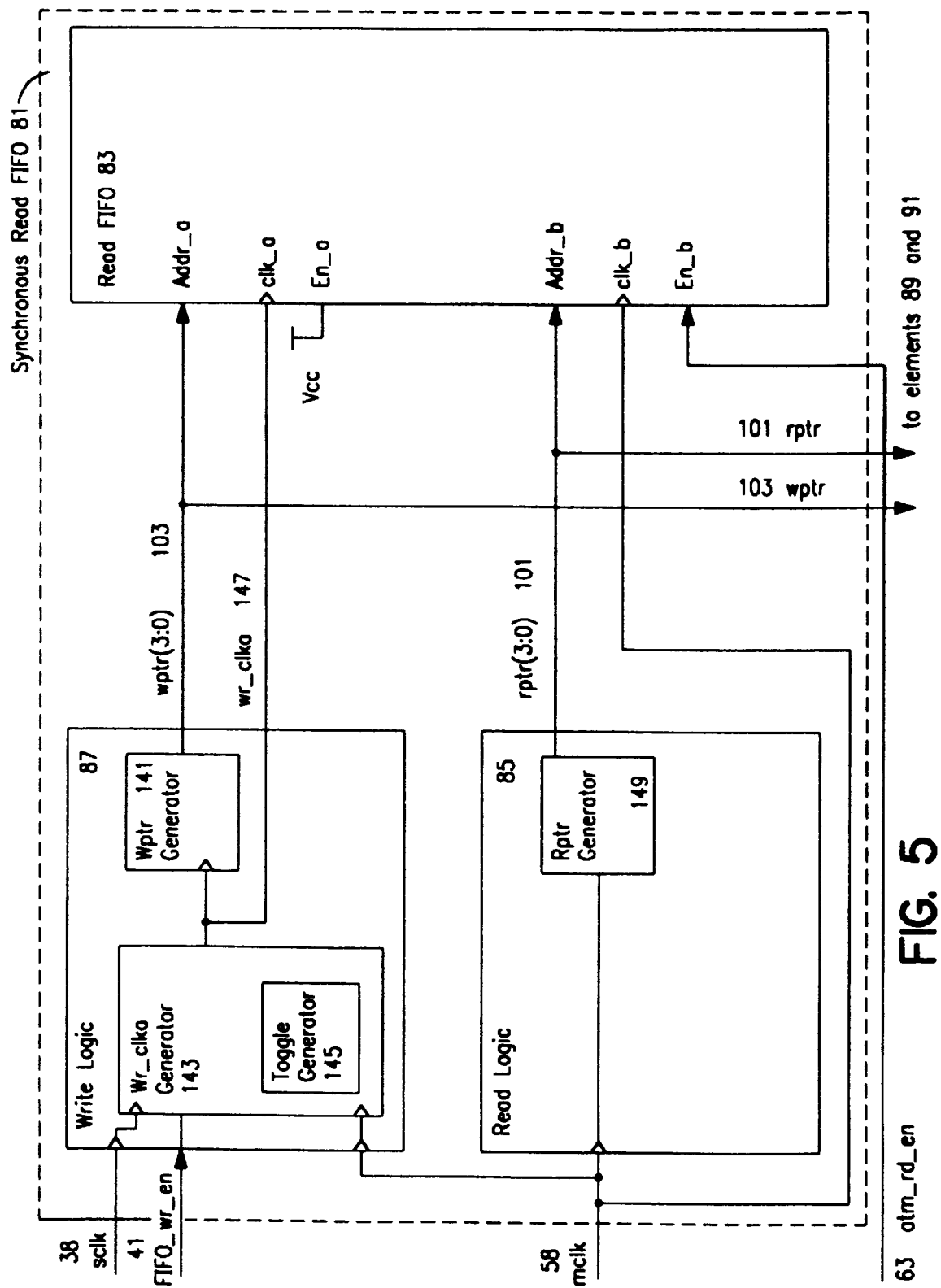
FIG. 5 illustrates a block diagram of the synchronous Read FIFO of the present invention.

FIG. 5 illustrates in further detail the synchronous Read FIFO 81. The Read FIFO 83 may be implemented as a Dual Port RAM (DPRAM) having an A port for writing into the DPRAM and a B port for reading from the DPRAM. Each port has separate address lines, clocks, and a read or write enable.

Write logic 87 includes a Write Pointer Generator 141 that generates the wptr (e.g., address) into port A of DPRAM 83. The Write Pointer Generator 141 may be implemented with a circular counter that increments the wptr 103 whenever it receives a clock signal. Write logic 87 also includes a Wr_clka Generator 143 that synchronizes the sclk-based FIFO_wr_en 41 to mclk 58. This Wr_clka Generator 143 is provided the mclk 58, the sclk 38, and the FIFO_wr_en signal 41 and provides to the Write Pointer Generator 141 the synchronized write clock signal (wr_clka) 147. The wr_clka signal 147 is also provided to the clock input of (i.e., clk_a) port A of the DPRAM 83. The circuitry to implement the Wr_clka Generator 143 will be described in further detail hereinafter with respect to FIG. 6.

Read logic 85 includes a Read Pointer Generator (Rptr Generator) 149 that is clocked by mclk 58 to generate the read pointer 101 that is provided to the address inputs of port B of the DPRAM 83. Port B is clocked with mclk 58. The Read Pointer Generator 149 may also be implemented as a circular counter that increments rptr 101 at every mclk cycle. The read enable for port B is ATM_rd_en signal 63.

Figure 6:
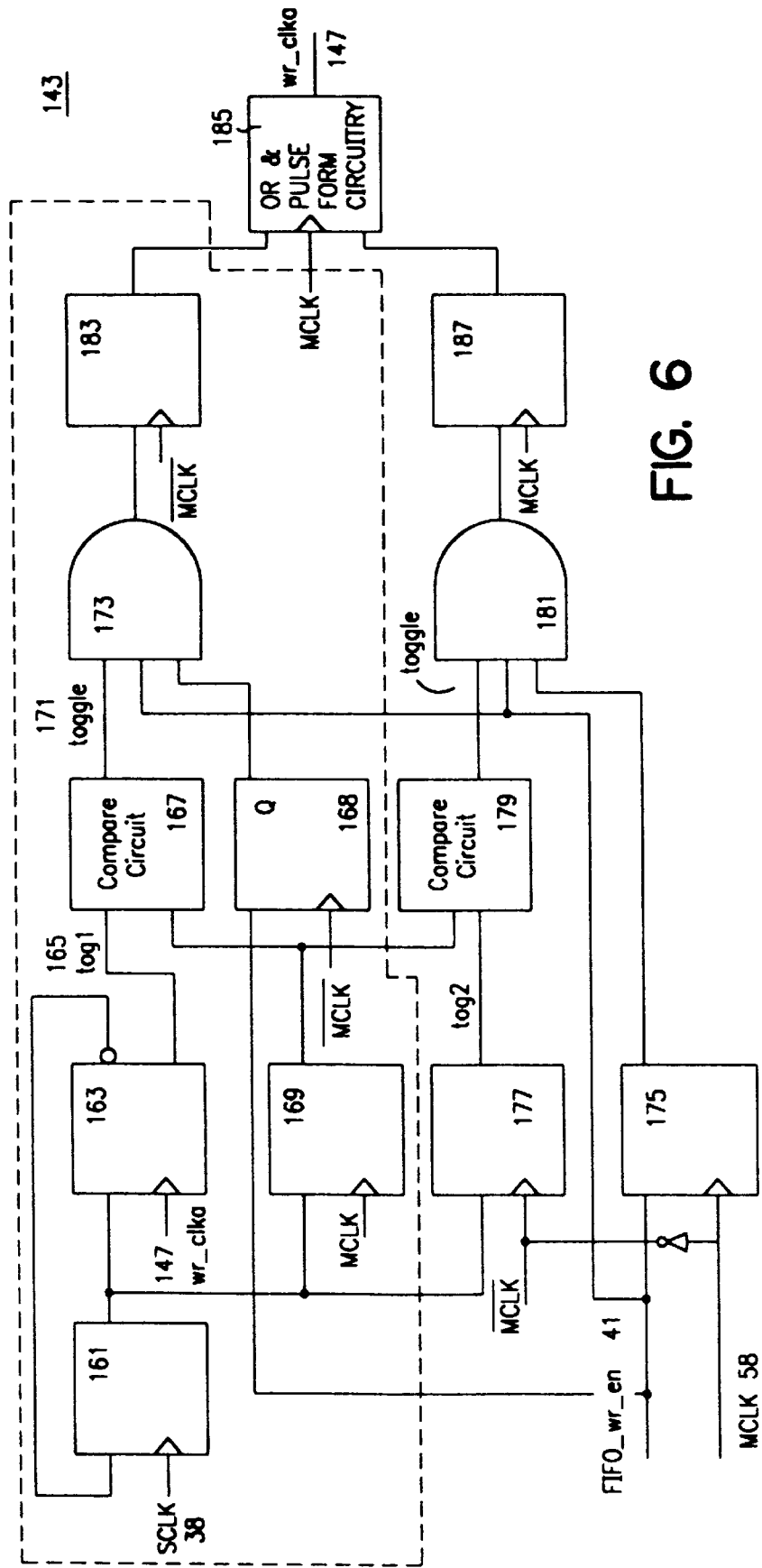
FIG. 6 illustrates a detailed implementation of the synchronization logic associated with the Read FIFO.

FIG. 6 illustrates the Wr_clka Generator circuitry 143 of the present invention. A first flip-flop 161 is provided the sclk 38 to generate a signal that is fed into a second flip-flop 163 that is clocked with wr_clka 147. The output of flip-flop 163 is a tog1 signal 165 that is provided to a first compare circuit 167 to generate a toggle signal 171, which is further fed into an AND gate 173. The compare circuit 167 compares tog1 165 with the output of a flip-flop 169, that is clocked with mclk 58. The inverted output of flip-flop 163 is provided to the input of flip-flop 161.

The AND gate 173 is provided with the FIFO_wr_en signal 41 and also a signal from the output of a flip-flop 168 that is clocked with an inverted mclk. The flip-flop 168 is provided the FIFO_wr_en signal 41 to its input.

The output of the AND gate 173 is provided to another flip-flop 183 that is clocked with an inverted mclk 58. The output of this flop 183 is passed to an OR gate and Pulse Forming Circuitry 185 that is clocked with mclk 58 to generate the wr_clka signal 147.

The circuit components within the dotted lines are mirrored as the bottom portion of the Wr_clka Generator 143. Specifically, a flip-flop 177 that is clocked with the inverted mclk produces a tog2 signal that is fed into a second compare circuit 179. The output of the compare circuit 179 is provided to a second AND gate 181. AND gate 181 is provided with the FIFO_wr_enable signal 41 and the output of a flip-flop 175, which is clocked with mclk 58. The output of the AND gate 181 is provided as an input to another flip-flop 187, which is also clocked with mclk 58. The output of the flip-flop 187 is provided the OR gate and Pulse Forming Circuitry 185 to generate wr_clka 147.

As noted before the dotted line block is symmetrical with the bottom portion of the Wr_clka generator 143. The circuit elements in the dotted portion sample FIFO_wr_en 41 with an mclk 58 rising edge and then with an mclk 58 falling edge. Two samples are needed for every synchronization. The bottom portion of the Wr_clka Generator circuit 143 samples FIFO_wr_en on a falling edge of the mclk and then on the rising edge of an mclk. Either the top half or the bottom half circuit will obtain the sample of FIFO_wr_en 41 and will toggle the appropriate internal flag (i.e., tog1 or tog2) to inhibit the other half from obtaining the sample.

The Wr_clka Generator 143 synchronizes the sclk-based FIFO_wr_en 41 signal to mclk 38. A wr_clka signal 147, which is a function of mclk 58, is produced whenever there is a valid FIFO_wr_en 41. The wr_clka 147 is either synchronized to the rising or falling edge of mclk 58. The wr_clka 147 is used to maintain the wptr 103 and to clock port A of the DPRAM 83.

The present invention utilizes the fact that mclk 58 is much faster than sclk 38. In this particular embodiment, each sclk 38 period has to be at least one 1.5 times as long as mclk 58 to accommodate 3 edges of mclk. As a result of this characteristic, synchronization logic 84 is vastly simplified (e.g., only a minimal number of gates and flip-flops required to implement the present invention instead of many flip-flops and special handshake logic as is required in the prior art). This synchronization scheme works equally well irrespective of how large the FIFO may be (i.e., not dependent on FIFO size). The present invention samples the sclk-based FIFO_wr_en 41 by the mclk 58 when the synchronization circuit 143 deems it is appropriate. Sampling of FIFO_wr_en 41 is based on each mclk edge (e.g., rising edge and then falling edge or falling edge and then rising edge). The product of this sampling or synchronization is a pulse, wr_clka 147, which is used to update the write pointer and also used as a write clock into the read DPRAM 83. Thus, the Read FIFO (DPRAM) 83 operates in only one clock domain (i.e., mclk domain) and in a completely synchronous edge-based fashion rather than a latch-based fashion.

A Toggle Generator 145 in the Wr_clka Generator 143 generates a flag (e.g., toggle) that is toggled every sclk 38 rising edge after a valid FIFO_wr_en 41 is sampled by two mclk 58 edges, and the wr_clka 147 is produced. If the flag has toggled, and there is another FIFO_wr_en 41 sensed by an mclk edge, then it can continue on through a synchro (e.g., two flops in series) to produce another wr_clka 147. Once the wr_clka 147 is produced, on the next sclk rising edge, the flag will toggle again. Thus, the present invention provides a lock-step synchronization that is guaranteed to be reliable on every mclk 58 rising edge. Furthermore, the present invention is simple and efficient to implement (e.g., minimal logic to implement).

Figure 7:
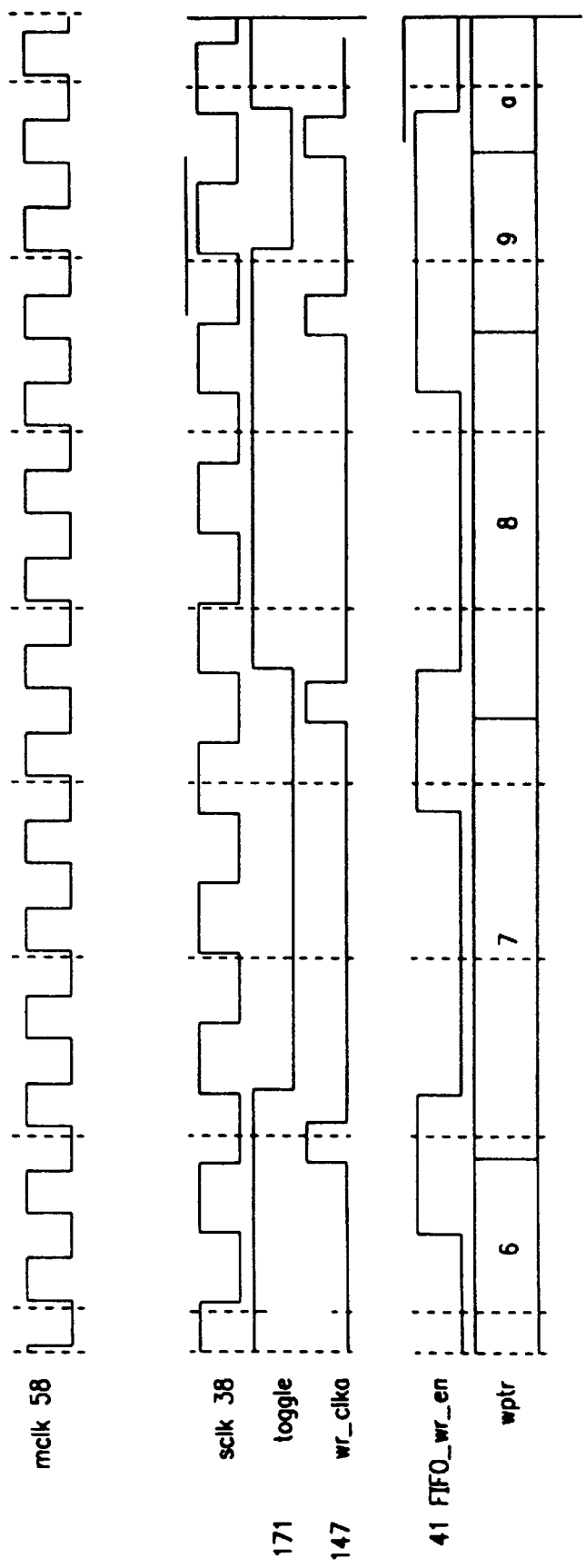
FIG. 7 illustrates the timing diagram associated with the synchronization logic shown in FIG. 6.

FIG. 7 illustrates a timing diagram for wr_clka generator and synchronizer block 143, as illustrated in FIG. 6. FIG. 7 illustrates the following relevant signals: mclk 58, sclk 38, toggle signal 171, wr_clka 147, FIFO_wr_en signal 41 and the wptr 103. As previously mentioned, mclk 58 and sclk 38 are asynchronous to each other (e.g., no assumption on the relative phase of mclk 58 and sclk 38). In this particular embodiment, mclk 58 is approximately 40 MHz, and sclk 38 is approximately in the range of 16 to 25 MHz. Both the rptr 101 and wptr 103 are synchronized to mclk 58. The present invention uses the At_least_x_words_filled flags to ensure that there are no simultaneous reads and writes to the same location. The ATM read logic 20 refers to the appropriate flag and reads no more than the flag allows. Since the flag is a real time true indicator of the number of new unread words in the FIFO at all times (e.g., when the FIFO wrapped around, when the FIFO is not or when one pointer to the FIFO is stationary).

In this embodiment, 64 of bits of data are written into or read out of the Read FIFO 83 at one time.

Referring now to FIG. 7, the wr_clka 147 is generated when FIFO_wr_en 41 is asserted both at the rising edge and falling edge of mclk 58, and the sample of FIFO_wr_en 41 at the rising edge of mclk 58 is equal to the sample value at the falling edge of mclk 58. The wr_clka 147 lasts one-half the period of mclk 58 and is generated only once for a particular toggle value. The toggle is a different value than that in a previous wr_clka cycle (i.e., toggles between two values every wr_clka cycle). The wr_clka increments wptr 103 so that it points the next storage location to be written. Mclk 58 increments the read pointer (rptr) 101 to point to the next storage location to be read.

Figure 8:
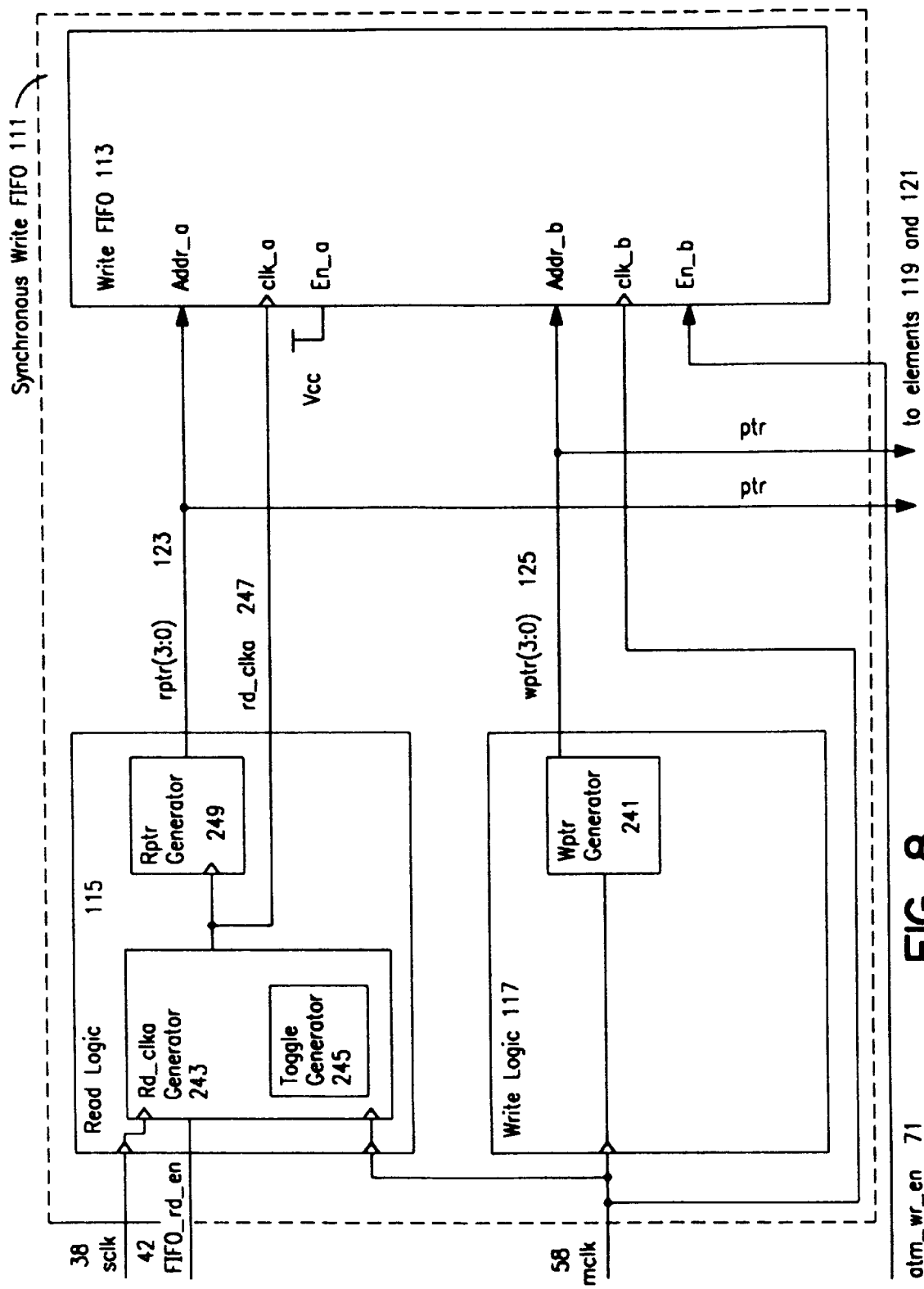
FIG. 8 illustrate a detailed block diagram of the synchronous Write FIFO of the present invention.

FIG. 8 illustrates in further detail the synchronous Write FIFO 111. The Write FIFO 113 may be implemented as a Dual Port RAM (DPRAM) having an A port for reading from the DPRAM and a B port for writing to the DPRAM. Each port has separate address lines, clocks, and a read or write enable.

Read logic 115 includes a Read Pointer Generator 249 that generates the rptr 123 (e.g., address) into port A of DPRAM 113. The Read Pointer Generator 249 may be implemented with a circular counter that increments the rptr 123 whenever it receives a clock signal. Read logic 115 also includes a Rd_clka Generator 243 that synchronizes the sclk-based FIFO_rd_en 42 to mclk 58. This Rd_clka generator 243 is provided the mclk 58, the sclk 38, and the FIFO_rd_en signal 42 and provides to the Read Pointer Generator 249 the synchronizing write clock signal (rd_clka) 247. The rd_clka signal 247 is also provided to the clock input of (i.e., clk_a) port A of the DPRAM 113. The circuitry to implement the Rd_clka generator 243 will be described in further detail hereinafter with respect to FIG. 9.

Write Logic 117 includes a Write Pointer Generator (Wptr Generator) 241, which is clocked by mclk 58 when ATM_wr_en 71 is asserted. The Write Pointer Generator 241 generates the write pointer 125 that is provided to the address inputs of port B of the DPRAM 113. Port B is clocked with mclk 58. The Write Pointer Generator 241 may also be implemented as a circular counter that increments wptr 125 at every mclk cycle.

Figure 9:
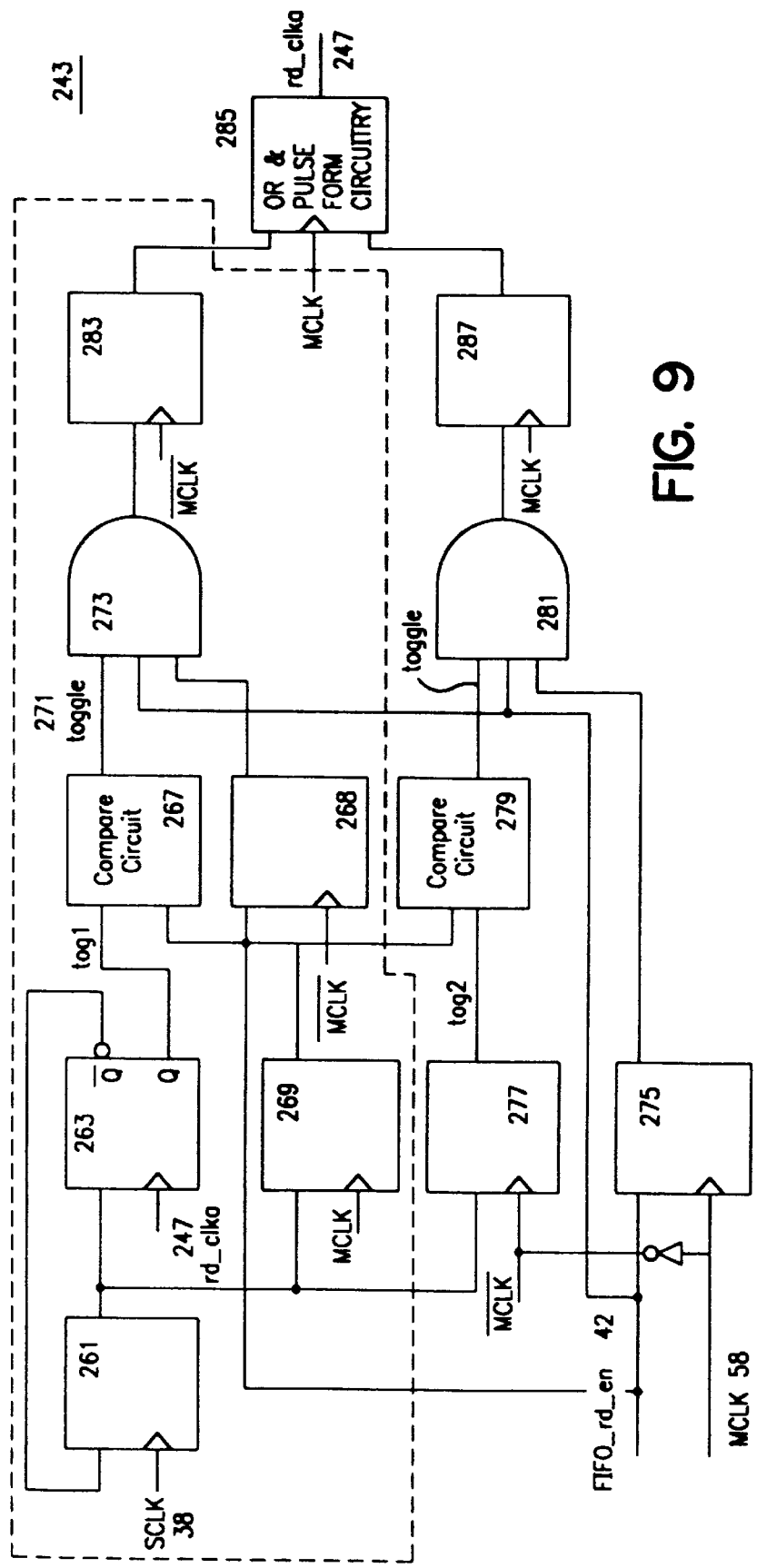
FIG. 9 illustrates a detailed implementation of the synchronization logic associated with the Write FIFO of the present invention.

FIG. 9 illustrates the Rd_clka Generator circuitry 243 of the present invention. A first flip-flop 261 is provided the sclk 38 to generate a signal that is fed into a second flip-flop 263 that is clocked with rd_clka 247. The output of flip-flop 263 is a tog1 signal 265 that is provided to a first compare circuit 267 to generate a toggle signal 271, which is further fed into an AND gate 273. The compare circuit 267 compares tog1 265 with the output of a flip-flop 269, that is clocked with mclk 58. The inverted output of flip-flop 263 is coupled to the input of flip-flop 261.

The output of the AND gate 273 is provided to another flip-flop 283 that is clocked with an inverted mclk 58. The output of flip-flop 283 is passed to an OR gate and Pulse Forming Circuitry 285 that is clocked with mclk 58 to generate the rd_clka signal 247.

AND gate 273 is also provided with the FIFO_rd_en signal 42 and the output of a flip-flop 268 which is clocked by an inverted mclk. Flip-flop 268 has the FIFO_rd_en signal 42 as an input.

The circuit components within the dotted lines are mirrored as the bottom portion of the Rd_clka generator 243. Specifically, a flip-flop 277 that is clocked with an inverted mclk 58 produces a tog2 signal that is fed into a second compare circuit 279. The output of the compare circuit 279 is provided to a second AND gate 281. AND gate 281 is also provided with the FIFO_rd_enable signal 42 and the output of a flip-flop 275, which is also clocked with mclk 58. The output of the AND gate 281 is provided as an input to another flip-flop 287, which is also clocked with mclk 58. The output of the flip-flop 287 is provided the OR gate and Pulse Forming Circuitry 285 to generate rd_clka 247.

As noted before the dotted line block is symmetrical with the bottom portion of the Rd_clka generator 243. The circuit elements in the dotted portion sample FIFO_rd_en 42 with an mclk 58 rising edge and then with an mclk 58 falling edge. Two samples are needed for every synchronization. The bottom portion of the Rd_clka Generator circuit 243 samples FIFO_rd_en on a falling edge of the mclk and then on the rising edge of an mclk. Either the top half or the bottom half circuit will obtain the sample of FIFO_rd_en 42 and will toggle the appropriate internal flag (i.e., tog1 or tog2) to inhibit the other half from obtaining the sample.

The Rd_clka generator 243 synchronizes the sclk-based FIFO_rd_en 42 signal to mclk 38. A rd_clka signal 247, which is a function of mclk 58, is produced whenever there is a valid FIFO_rd_en 42. The rd_clka 247 is used to maintain the rptr 123 and to clock port A of the DPRAM 113.

The present invention utilizes the fact that mclk 58 is much faster than sclk 38. In this particular embodiment, each sclk 38 period has to be at least one 1.5 times as long as mclk 58. The present invention samples the sclk-based FIFO_rd_en 42 by the mclk 58 when the synchronization circuit 243 deems it is appropriate. Sampling of FIFO_rd_en 42 is based on each mclk edge (e.g., rising edge and then falling edge or falling edge and then rising edge). The product of this sampling or synchronization is a pulse, rd_clka 247, which is used to update the write pointer and also used as a write clock into the read DPRAM 113. Thus, the Read FIFO (DPRAM) 113 operates in only one clock domain (i.e., mclk domain) and in a completely synchronous edge-based fashion rather than a latch-based fashion.

A Toggle Generator 245 in the Rd_clka generator 243 generates a flag (e.g., toggle) that is toggled every sclk 38 rising edge after a valid FIFO_rd_en 42 is sampled by two mclk 58 edges, and the rd_clka 247 is produced. If the flag has toggled, and there is another FIFO_rd_en 42 sensed by an mclk edge, then it can continue on through a synchro (e.g., two flops in series) to produce another rd_clka 247.

Once the rd_clka 247 is produced, on the next sclk rising edge, the flag will toggle again. Thus, the present invention provides a lock-step synchronization that is guaranteed to be reliable on every mclk 58 rising edge. Furthermore, the present invention is simple and efficient to implement (e.g., minimal logic to implement).

Figure 10:
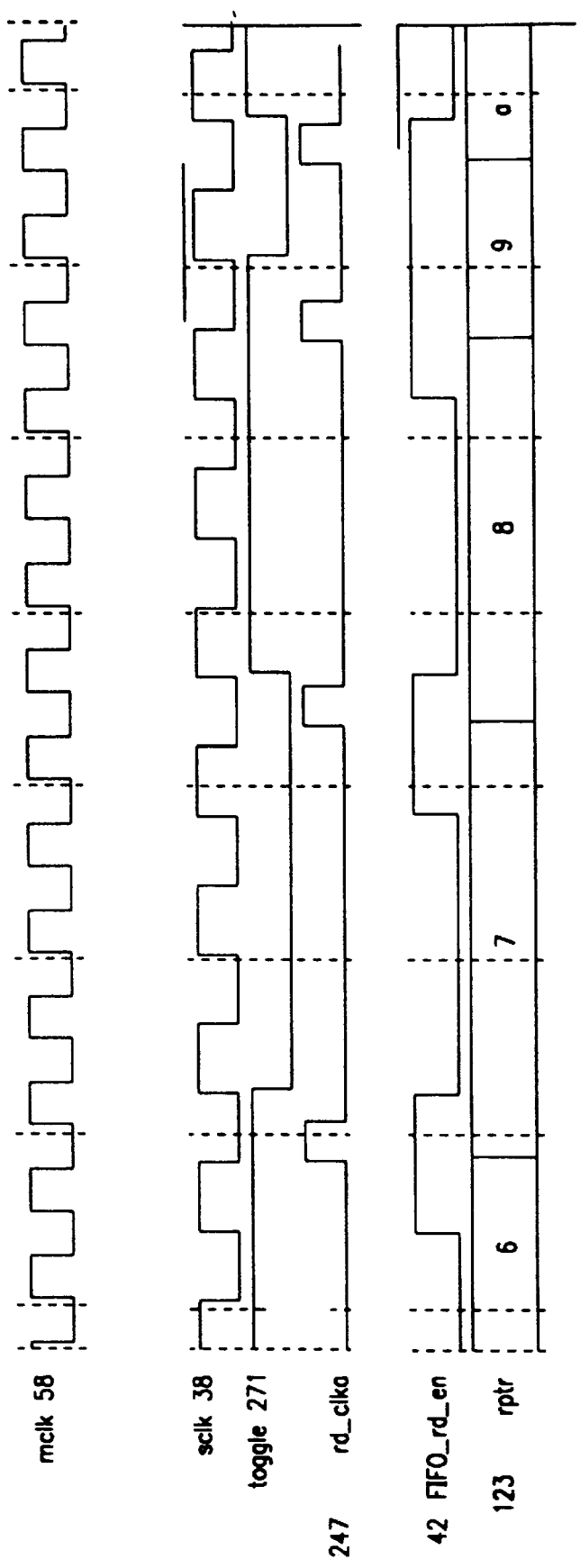
FIG. 10 illustrates the timing diagram associated with the synchronization logic of FIG. 9.

FIG. 10 illustrates a timing diagram for Rd_clka Generator 243, as illustrated in FIG. 9. FIG. 10 illustrates the following relevant signals: mclk 58, salk 38, toggle signal 271, rd_clka 247, FIFO_rd_en signal 42 and the rptr 123. As previously mentioned, mclk 58 and salk 38 are asynchronous to each other (e.g., no assumption on the relative phase of mclk 58 and sclk 38). In this particular embodiment, mclk 58 is approximately 40 MHz, and sclk 38 is approximately in the range of 16 to 25 MHz. Both the wptr 125 and rptr 123 are synchronized to mclk 58. The At_least_y_words_empty Flag Generator 121 ensures that there are no simultaneous reads and writes to the same location in the Write FIFO 113.

In this embodiment, 64 of bits of data are written into or read out of the Write FIFO 113 at one time.

Referring now to FIG. 10, the rd_clka 247 is generated when FIFO_rd_en 42 is asserted both at the rising edge and falling edge of mclk 58. The toggle signal 271 indicates that the previous rd_clka has happened and that this is a new sample of FIFO_rd_en 42. The rd_clka 247 lasts one-half the period of mclk 58 and is generated only once for a particular toggle value. The rd_clka 247 increments rptr 123 so that it points the next storage location to be written. Mclk 58 increments the write pointer (wptr) 125 to point to the next storage location to be written.

Whether or not Read FIFO has enough room for a direct memory data transfer (DMA) at a particular sclk cycle depends on the value of both rptr and wptr. The "distance" (e.g., number of storage locations between the location pointed to by the rptr and the location pointed to by the wptr) is dynamically determined by the present invention on every mclk cycle since rptr and wptr can potentially be updated every mclk.

There are four separate cases to consider. In the first case the rptr is less than wptr (i.e., trailing behind wptr), and wptr has not wrapped around. In the second case the rptr is less than wptr, and wptr has wrapped around. In the third case the rptr is equal to wptr, and rptr was catching up to wptr. In the fourth case the rptr is equal to wptr, and rptr was backing up into wptr (e.g. rptr could be stalling at location 2, and wptr is incrementing from location 0 to 1).

An adjustment to the distance between rptr and wptr is needed when a previous Sbus DMA is still in progress, and data is still trickling into the Read FIFO. When the present invention processes a current request (e.g., a read or write request from ATM_SYS 47 to request a block of bytes from or to host memory), it dynamically accounts for the adjustment to the distance between rptr and wptr in deciding whether or not to assert the bus grant enable signal 39, 42, which is based on the previous and the current requests' data size and address.

This adjustment is based on an old expected number of words yet to be transferred into the Read FIFO. The old expected number of words yet to come depends on the old rd_size, rd_addr, and a snapshot of wptr (i.e., the value of wptr when SB_PRO indicated that it is at the beginning of a transaction). The Sbus state indicates the beginning of a Sbus transaction. The current wptr, rptr, rd_size, and rd_addr are all synchronous to mclk.

The rd_BR_en is a flag that is generated when the difference between the distance between rptr and wptr and the adjustment is greater than or equal to the number of bytes to be transferred to/from memory for this current request from ATM_SYS 47. The rd_BR_en is dynamically determined in mclk domain and synchronized to sclk.

Thus, rd_BR_en is updated every mclk and sampled by every sclk. When SB_PRO is ready to assert bus request, the rd_BR_en signal determines if a bus request may be asserted at that sclk cycle out onto the bus 35.

Figure 11:
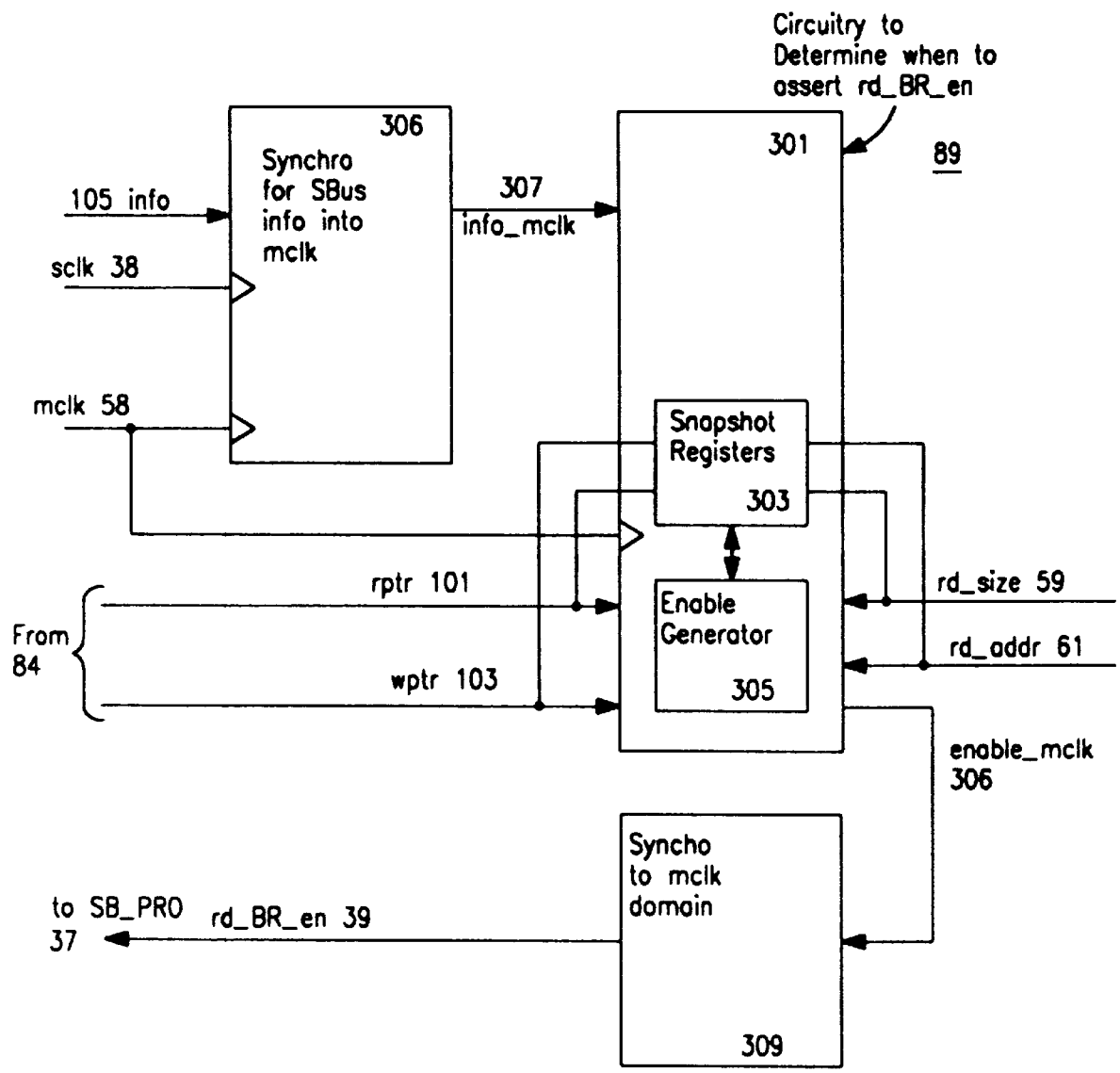
FIG. 11 illustrates a detailed block diagram for the Read Bus Request Enable Generator of the present invention.

FIG. 11 illustrates in further detail the components of the Read Bus Request Enable Generator 89 of the present invention. The Read Bus Request Enable Generator 89 includes circuitry 301 to determine when to assert a Read Bus Request Enable signal (rd_BR_en) 39. This circuitry 301 further includes a plurality of Snapshot Registers 303 and an Enable Generator 305. The circuitry 301 is coupled to a synchronization circuit (synchro) 306 that converts Sbus information 101, which is sclk 38 based, into Sbus information 307 that is synchronous to mclk 58 (i.e., info_mclk). The Sbus state information 101 indicates to the RBREG 89 the appropriate point in the address translation cycle of an Sbus cycle, so that a reliable snap-shot of wptr or rptr can be taken. Synchros are well known in the art for synchronizing a first signal that is based on a first clock to a second signal that is synchronous to a second clock. A synchro may be implemented by two flip-flops in series.

The Enable Generator 305 generates a bus request enable signal (enable_mclk) 306 that is synchronous to mclk 58. The Enable Generator 305 is provided the current rptr 101 and wptr 103 from the synchronous Read FIFO circuit 81, info_mclk 307 from the synchro 306, the current rd_size 59 and rd_addr 61 from ATM_SYS 47 and old values of rptr 101, wptr 103, rd_size 59, rd_addr 61 and info_mclk 307 from a plurality of Snapshot registers 303. The Snapshot Registers 303 serve to latch old values (e.g., the state of the Read FIFO at a previous mclk cycle). The Enable Generator 305 dynamically determines an enable_mclk signal 306 from the information that is provided (e.g., both the current state information of the Read FIFO and the old state information of the Read FIFO). The enable_mclk signal 306 is generated by calculating the following: (the distance between rptr and wptr)−(words yet to come from an ongoing previous Sbus DMA in the case of a back-to-back read DMA for example)≧(number of bytes to be read over Sbus based on the current rd_size and rd_addr). This relationship may be implemented by arithmetic and/or combinatorial logic circuitry, which is known in the art. The enable_mclk 306 is sent to synchro 309 which generates the rd_BR_en signal 39. Enable mclk 306 is a single bit flag. Synchro 309 simply synchronizes the mclk-based signal, enable_mclk 306, into a sclk-based signal, rd_BR_en 39.

Figure 12:
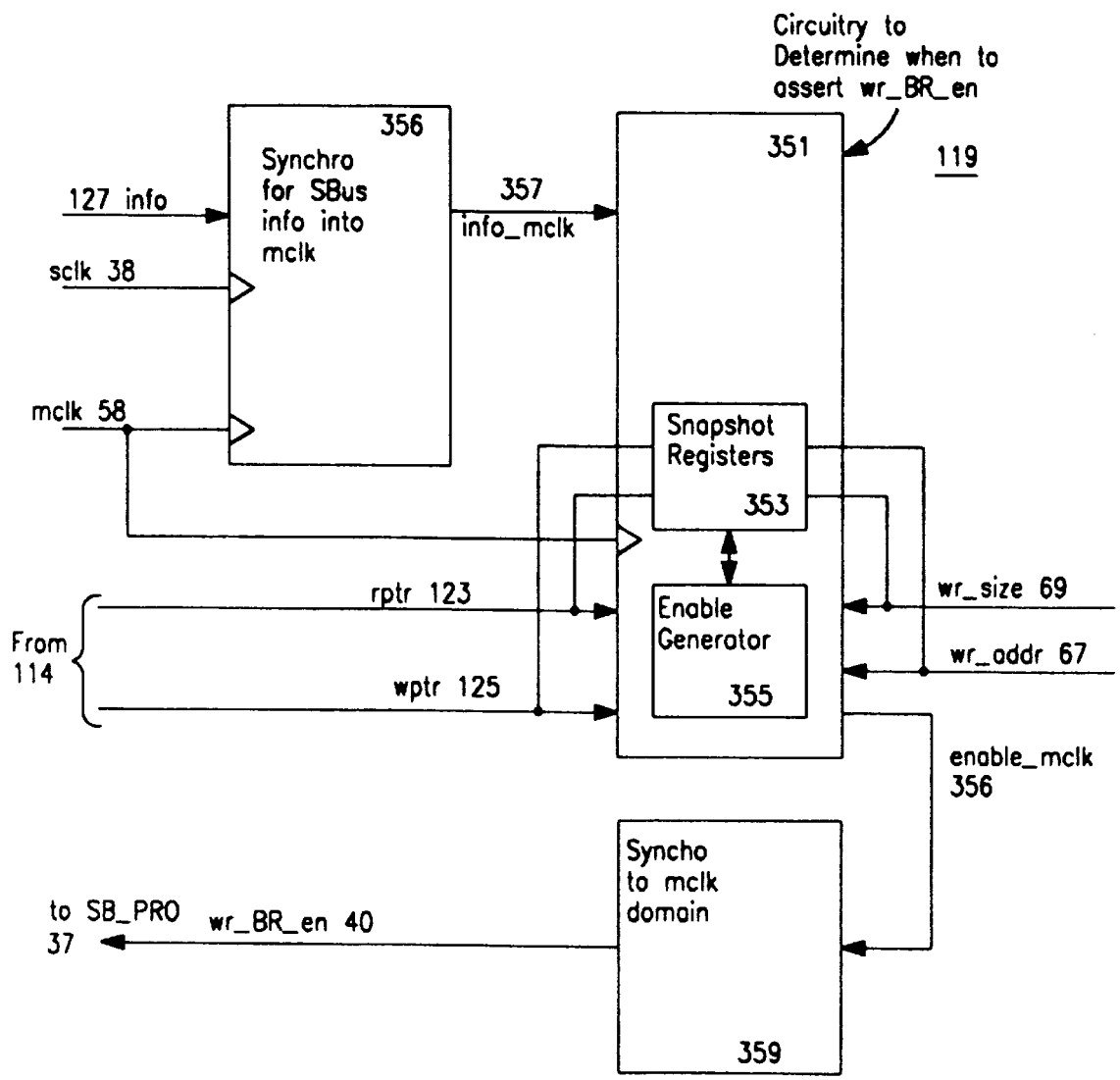
FIG. 12 illustrates a detailed block diagram for the Write Bus Request Enable Generator.

Whereas FIG. 11 illustrates logic 89 to generate the Read Bus Request Enable signal 39 for ensuring that back-to-back DMA reads may be accommodated, FIG. 12 illustrates in further detail the components of the Write Bus Request Enable Generator 119, which accounts for back-to-back DMA writes. The Write Generator 119 generates a Write Bus Enable signal 40 (wr_BR_en) and provides it to SB_PRO 37. Moreover, the Sbus cycle information 127, the write size 69 and the write address 67 concern back-to-back DMA writes. In other words, the Write Bus Request Enable Generator 119 dynamically determines whether or not there is enough data in the Write FIFO 113 to be transferred and written to the memory 20 at every mclk 58 cycle. The Bus Request Enable Generators 89, 119 maximize the use of I/O bandwidth to pipeline back to back DMAs. The enable_mclk signal 356 is generated by calculating the following: (the distance between rptr and wptr)−(words yet to be read from an ongoing previous Sbus DMA in the case of a back-to-back write DMA)≧(number of bytes to be written over Sbus based on the current wr_size and wr_addr). This relationship may be implemented by arithmetic and/or combinatorial logic circuitry, which is known in the art.

Figure 13:
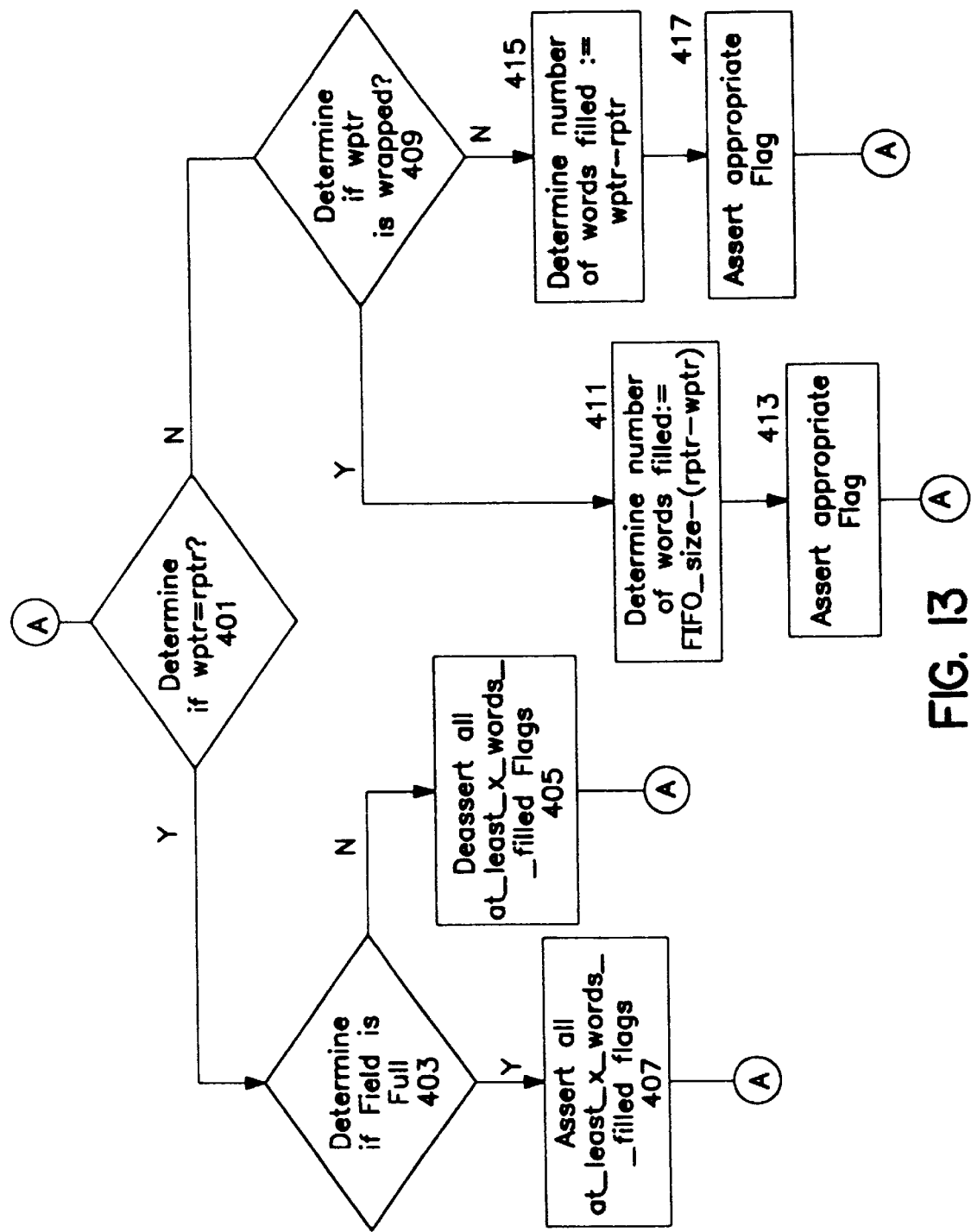
FIG. 13 illustrates a flowchart that describes how the flags that indicate how many filled spaces are in the Write FIFO at every clock cycle are dynamically determined.

FIG. 13 illustrates a flowchart describing how the At_least_x_words_filled Flag Generator 91 generates a plurality of flags that indicate the number of words filled in the Read FIFO 83. First, the Flag Generator 91 determines whether or not the read and write pointers are equal (decision block 401). If they are equal, the Flag Generator 91 further determines whether the Read FIFO 83 is full (decision block 403). If the Read FIFO 83 is full, the Flag Generator 91 will assert all At_least_x_words_filled flags 65 (i.e., all flags will be valid) (block 407). If the FIFO 83 is not full, the FIFO 83 must be empty and (i.e., if rptr=wptr and not full, then the FIFO must be empty), Flag Generator 91 does deassert all At_least_x_words_filled flags 405.

If the Flag Generator 91 determines that the write pointer is not equal to the read pointer, a further determination 409 is made whether or not the wptr 103 has wrapped around. If it is determined that the wptr 103 is wrapped around, then the number of words filled is equal to the size of the FIFO (e.g. 14 64-bit locations in this embodiment) minus the difference between the read pointer and the write pointer (block 411). If the Read FIFO 83 is not wrapped around, then the number of words filled is simply equal to the difference of the write pointer and the read pointer (block 415). Once the number of words filled is calculated, the appropriate flag is set by the Flag Generator 91 (blocks 413, 417) and sent to ATM_SYS 47 at every mclk cycle. The present invention updates these flags in one and every mclk cycle.

Figure 14:
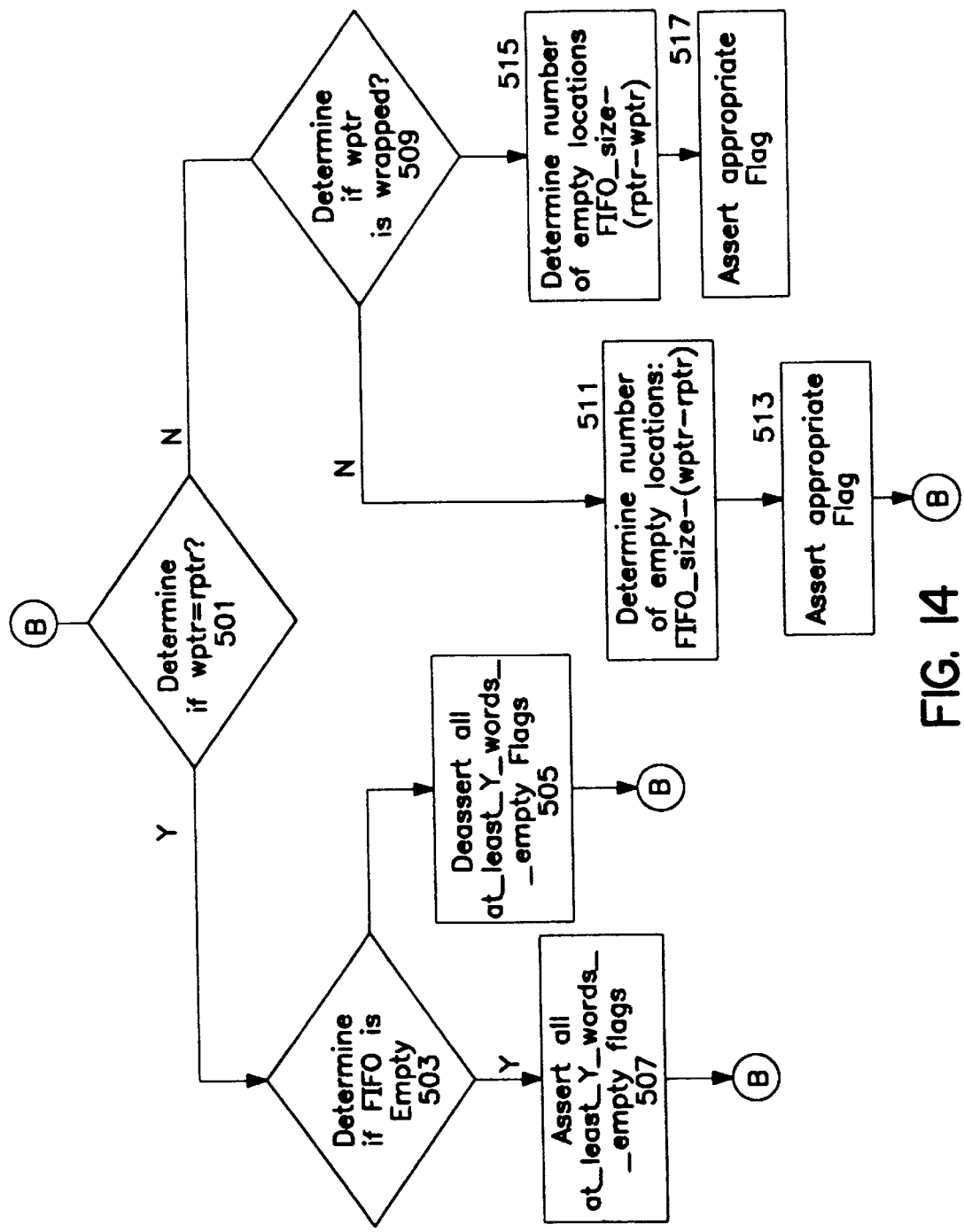
FIG. 14 illustrates a flowchart that describes how the flags that indicate how many empty spaces are in the Write FIFO at every clock cycle are dynamically determined.

FIG. 14 illustrates how the At_least_y_words_empty Flag Generator 121 dynamically determines at every mclk cycle the number of empty storage locations in the write FIFO 113. The methodology, followed by Flag Generator 121, tracks the steps as shown in FIG. 14. The Flag Generator 121 dynamically determines the number of empty storage locations in the Write FIFO 113. Flag Generator 121 generates a plurality of flags that indicate that there are at least "y" number of empty word locations in the Write FIFO 113. Y may be any integer number (e.g., in this implementation y is equal to 2, 4, 6 or 8). These flags 73 provide information to ATM_SYS 47 so that ATM_SYS 47 can determine at every mclk 58 the number of words it may write into the Write FIFO 113.

First, the Flag Generator 121 first determines if wptr 123 is equal to wptr 125. (decision block 501). If these two pointers are equal, the determination (decision block 503) is made to determine whether or not the Write FIFO 113 is empty. If the Write FIFO 113 is empty, the Flag Generator 121 asserts all the At_least_y_words_empty flags (block 507). If it is determined that the Write FIFO 113 is to empty, the Flag Generator 121 deasserts all the At_least_y_words_empty flags (block 505).

If it is determined that wptr 125 is not equal to rptr 123, a further determination 509 is made to determine whether or not the wptr 125 has a wrapped around. If the wptr 125 has wrapped around, the Flag Generator 121 determines the number of empty locations in the Write FiFO 113 with the following equation: number of empty locations=FIFO size−(wptr−rptr (block 511). The appropriate flag is then asserted (block 513). If it is determined that wptr 125 is not wrapped around, then the Flag Generator 121 determines the number of empty locations in the FIFO with the following equation: number of empty locations equals FIFO size−(rptr−wptr), and the appropriate flag is set (blocks 515 and 517).

Thus, the Flag Generator 91 provides a plurality of flags indicating to ATM_SYS 47 the number of storage locations with value data in Read FIFO 83 so that the ATM_SYS 47 can read ATM_data_out 49 from the Read FIFO 83 as soon as it is available without having to wait for a completely full Read FIFO 83. Similarly, the Flag Generator 121 of the present invention provides flags to indicate the number of empty storage locations in Write FIFO 113 so that the ATM_SYS 47 can determine on every mclk 58 cycle the number of words it can write to the Write FIFO 113.

The present invention provides numerous advantages over the prior art. First, the present invention provides a simplified synchronization scheme that uses a toggle signal to synchronize (e.g., sample) an sclk-based signal (e.g., FIFO_write_en and FIFO_rd_en) in a lock-step fashion. Second, the present invention allows for swift data movement through the FIFOs by providing fullness indicators that indicate the contents of the FIFO with granularity. Third, the present invention allows ATM_SYS to perform back-to-back data requests (e.g., read and write requests to host memory). In other words, the present invention provides a look ahead indication, so that ATM_SYS does not need to wait until one memory request is fully completed before asserting subsequent requests.

In the foregoing specification, the invention has been described with reference to specific exemplary embodiments thereof. It will however be evident that various modifications and changes made be made thereto without departing from the broader spirit and scope of the invention as set forth in the appended claims. The specification and drawings are accordingly to be regarded as illustrative rather than restrictive.

What is claimed is:

1. An interface circuit for use in one bit or multiple bit synchronization schemes is interposed between a first circuitry synchronous to a first clock and a second circuitry synchronous to a second clock for transferring data between the first circuitry and the second circuitry, said first and second clocks being asynchronous with respect to each other and said second clock being faster than said first clock, said interface circuit comprising:

(a) a first buffer having a plurality of storage locations for transferring data from the first circuitry to the second circuitry, wherein the first circuitry writes to a storage location pointed to by a write pointer in the first buffer, and the second circuitry reads from a storage location pointed to by a read pointer in the first buffer;

(b) first synchronization means coupled to the first buffer for synchronizing writes and reads to the first buffer, said first synchronization means including a clock generator generating a synchronizing clock, said first synchronization means providing the synchronizing clock to a write port of the first buffer and to a write pointer generator generating the write pointer; and (c) filled locations determining means coupled to said first synchronization means for dynamically determining how many storage locations are filled with data and for providing a plurality of flags, said flags indicating varying degrees of fullness of the first buffer to said second circuitry at every cycle of the second clock.

2. The interface circuit as set forth in claim 1 wherein the first buffer is a first-in-first-out (FIFO) buffer.

3. The interface circuit as set forth in claim 1 wherein the first buffer is a dual port RAM having a read port and a write port.

4. The interface circuit as set forth in claim 1 wherein the first clock is at 16 MHz to 25 MHz and the second clock is at approximately 40 MHz.

5. The interface circuit as set forth in claim 1 wherein the first synchronization means further includes means for generating the read pointer and means for generating the write pointer.

6. The interface circuit, as set forth in claim 5 wherein the means for generating the read pointer and the means for generating the write pointer are circular counters.

7. The interface circuit as claimed in claim 1 wherein the filled locations determining means is coupled to receive the write pointer and the read pointer, and based on the write pointer and the read pointer determines the number of locations in the first buffer that are filled by employing one of a first predetermined logical expression between a predetermined number, the write pointer and the read pointer, and a second predetermined logical expression between the write pointer and the read pointer, and asserting a flag corresponding to the number of locations filled in the first buffer.

8. The interface circuit as set forth in claim 1 further comprising:

(a) a second buffer having a plurality of storage locations for transferring data from the second circuitry to the first circuitry, wherein the second circuitry writes to a storage location pointed by a write pointer in the second buffer and the first circuitry reads a storage location pointed by a read pointer in the second buffer;

(b) second synchronization means coupled to the second buffer for synchronizing writes and reads to the second buffer; and (c) empty locations determining means coupled to the second synchronization means for dynamically determining how many storage locations are empty in the second buffer and for providing a plurality of flags, said flags indicating varying degrees of emptiness of the second buffer at every cycle of the second clock.

9. The interface circuit as set forth in claim 8 wherein the empty locations determining means further includes a plurality of snapshot registers for receiving and storing an old read pointer, an old write pointer, information from the second circuitry and information from the first circuitry and responsive thereto, generating an enable signal to the second circuitry, said enable signal enabling the bus request from the second circuitry.

10. The interface circuit as set forth in claim 9 wherein the second buffer is a first-in-first-out (FIFO) buffer.

11. The interface circuit as set forth in claim 9 wherein the second buffer is a dual port RAM having a read port and a write port.

12. The interface circuit as set forth in claim 9 wherein the synchronization means further includes means for generating the read pointer and means for generating the write pointer.

13. The interface circuit, as set forth in claim 12 wherein the means for generating the read pointer and the means for generating the write pointer are circular counters.

14. The interface circuit as set forth in claim 12 wherein the second synchronization means further includes a clock generator for generating a synchronizing clock and providing the synchronizing clock to the read port of the second buffer and to the read pointer generator means.

15. The interface circuit as set forth in claim 8 wherein the empty locations determining means is coupled to receive the write pointer and the read pointer and determines the number of empty locations in the buffer based upon one of a first predetermined logical expression between a predetermined number, the write pointer, and the read pointer, and a second predetermined logical expression between the predetermined number, the read pointer and the write pointer.

16. A computer system comprising:

a host processor synchronous to a first clock;

a memory coupled to the host processor;

a system bus coupled to the host processor;

a network card synchronous to a second clock and coupled to the system bus for allowing network communication, said first and second clocks being asynchronous with respect to each other and said second clock being faster than said first clock; and an interface circuit coupled to the system bus and said network card for transferring data between the system bus and the network card, said interface circuit including:

(a) a first buffer having a plurality of storage locations for transferring data from the first circuitry to the second circuitry, wherein the first circuitry writes to a storage location pointed to by a write pointer in the first buffer, and the second circuitry reads from a storage location pointed to by a read pointer in the first buffer;

(b) first synchronization means coupled to the first buffer for synchronizing writes and reads to the first buffer, said first synchronization means including a clock generator generating a synchronizing clock, said first synchronization means providing the synchronizing clock to a write port of the first buffer and to a write pointer generator generating the write pointer; and (c) filled locations determining means coupled to said first synchronization means for dynamically determining how many storage locations are filled with data and for providing a plurality of flags, said flags indicating varying degrees of fullness of the first buffer to said second circuitry at every cycle of the second clock.

17. The computer system as set forth in claim 16 wherein the first buffer is a first-in-first-out (FIFO) buffer.

18. The computer system as set forth in claim 16 wherein the first buffer is a dual port RAM having a read port and a write port.

19. The computer system as set forth in claim 16 wherein the first clock is at approximately 16 MHz to 25 MHz and the second clock is at approximately 40 MHz.

20. The computer system as set forth in claim 16 wherein the first synchronization means further includes means for generating the read pointer and means for generating the write pointer.

21. The computer system, as set forth in claim 20 wherein the means for generating the read pointer and the means for generating the write pointer are circular counters.

22. The computer system as claimed in claim 16 wherein the filled locations determining means is coupled to receive the write pointer and the read pointer, and based on the write pointer and the read pointer determines the number of locations in the first buffer that are filled by employing one of a first predetermined logical expression involving a predetermined number, the write pointer and the read pointer, and a second predetermined logical expression between the write pointer and the read pointer, and asserting a flag corresponding to the number of locations filled in the first buffer.

23. The computer system as set forth in claim 16 further comprising:
 (a) a second buffer having a plurality of storage locations for transferring data from the second circuitry to the first circuitry, wherein the second circuitry writes to a storage location pointed by a write pointer in the second buffer and the first circuitry reads a storage location pointed by a read pointer in the second buffer;
 (b) second synchronization means coupled to the second buffer for synchronizing writes and reads to the second buffer; and
 (c) empty locations determining means coupled to the second synchronization means for dynamically determining how many storage locations are empty in the second buffer and for providing a plurality of flags, said flags indicating varying degrees of emptiness of the second buffer at every cycle of the second clock.

24. The computer system as set forth in claim 23 wherein the second buffer is a first-in-first-out (FIFO) buffer.

25. The computer system as set forth in claim 23 wherein the second buffer is a dual port RAM having a read port and a write port.

26. The computer system as set forth in claim 23 wherein the synchronization means further includes
 means for generating the read pointer and means for generating the write pointer.

27. The computer system as set forth in claim 23 wherein the empty locations determining means is coupled to receive the write pointer and the read pointer and determines the number of empty locations in the buffer based upon one of a first predetermined logical expression between a predetermined number, the write pointer, and the read pointer, and a second predetermined logical expression between the predetermined number, the read pointer and the write pointer.

28. The computer system, as set forth in claim 26 wherein the means for generating the read pointer and the means for generating the write pointer are circular counters.

29. The computer system as set forth in claim 26 wherein the second synchronization means further includes a clock generator for generating a synchronizing clock and providing the synchronizing clock to the read port of the second buffer and to the read pointer generator means.

30. An interface circuit for use in one bit or multiple bit synchronization scheme is interposed between a first circuitry synchronous to a first clock and a second circuitry synchronous to a second clock for transferring data between the first circuitry and the second circuitry, said first and second clocks being asynchronous with respect to each other and said second clock being faster than said first clock, said interface circuit comprising:
 (a) a first buffer having a plurality of storage locations for transferring data from the first circuitry to the second circuitry, wherein the first circuitry writes to a storage location pointed to by a write pointer in the first buffer, and the second circuitry reads from a storage location pointed to by a read pointer in the first buffer;
 (b) first synchronization circuit coupled to the first buffer for synchronizing writes and reads to the first buffer, said first synchronization circuit including a clock generator generating a synchronizing clock, said first synchronization circuit providing the synchronizing clock to a write port of the first buffer and to a write pointer generator generating the write pointer; and
 (c) filled locations determining logic coupled to said first synchronization circuit for dynamically determining how many storage locations are filled with data and for providing a plurality of flags, said flags indicating varying degrees of fullness of the first buffer to said second circuitry at every cycle of the second clock.

31. A computer system comprising:
 a host processor synchronous to a first clock;
 a memory coupled to the host processor;
 a system bus coupled to the host processor;
 a network card synchronous to a second clock and coupled to the system bus for allowing network communication, said first and second clocks being asynchronous with respect to each other and said second clock being faster than said first clock; and
 an interface circuit coupled to the system bus and said network card for transferring data between the system bus and the network card, said interface circuit including:
 (a) a first buffer having a plurality of storage locations for transferring data from the first circuitry to the second circuitry, wherein the first circuitry writes to a storage location pointed to by a write pointer in the first buffer, and the second circuitry reads from a storage location pointed to by a read pointer in the first buffer;
 (b) first synchronization circuit coupled to the first buffer for synchronizing writes and reads to the first buffer, said first synchronization circuit including a clock generator generating a synchronizing clock, said first synchronization circuit providing the synchronizing clock to a write port of the first buffer and to a write pointer generator generating the write pointer; and
 (c) filled locations determining logic coupled to said first synchronization circuit for dynamically determining how many storage locations are filled with data and for providing a plurality of flags, said flags indicating varying degrees of fullness of the first buffer to said second circuitry at every cycle of the second clock.

* * * * *